United States Patent
Ikuta

(10) Patent No.: US 7,175,121 B2
(45) Date of Patent: Feb. 13, 2007

(54) SPINNING REEL SOUNDING MECHANISM

(75) Inventor: Takeshi Ikuta, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/953,460

(22) Filed: Sep. 30, 2004

(65) Prior Publication Data

US 2005/0145735 A1   Jul. 7, 2005

(30) Foreign Application Priority Data

| Oct. 28, 2003 | (JP) | .............................. 2003-366919 |
| Oct. 29, 2003 | (JP) | .............................. 2003-368958 |
| Jan. 9, 2004 | (JP) | .............................. 2004-004510 |

(51) Int. Cl.
*A01K 89/02* (2006.01)

(52) U.S. Cl. ...................... 242/307; 242/306

(58) Field of Classification Search ......... 242/305–308
See application file for complete search history.

(56) References Cited

U.S. PATENT DOCUMENTS

| 1,115,282 A | * | 10/1914 | Castle | .......................... 242/304 |
| 1,398,189 A | * | 11/1921 | Hodges et al. | ............... 242/308 |
| 1,439,926 A | * | 12/1922 | Teutsch | ....................... 242/314 |
| 1,470,640 A | * | 10/1923 | Pelletier | ....................... 242/265 |
| 1,639,629 A | * | 8/1927 | Case | .......................... 242/308 |
| 2,263,237 A | * | 11/1941 | Fiscus | .......................... 242/270 |
| 2,336,737 A | * | 12/1943 | Kreis | .......................... 242/308 |
| 2,633,308 A | * | 3/1953 | Zientowski | ................. 242/308 |
| 2,659,545 A | * | 11/1953 | Hoke et al. | .................. 242/227 |
| 3,138,343 A | * | 6/1964 | Henze | .......................... 242/308 |
| 4,088,279 A | * | 5/1978 | Karlsson et al. | ............ 242/307 |
| 4,702,432 A | | 10/1987 | Kaneko et al. | |
| 5,022,606 A | * | 6/1991 | Hashimoto | ................... 242/307 |
| 5,544,832 A | * | 8/1996 | Okamoto | ..................... 242/245 |
| 5,947,399 A | | 9/1999 | Oh | |
| 6,116,531 A | * | 9/2000 | Young | ......................... 242/301 |
| 6,688,545 B2 | * | 2/2004 | Kitajima et al. | ............. 242/306 |

FOREIGN PATENT DOCUMENTS

| JP | 6-16508 Y | 5/1994 |
| JP | 09-187199 A | 7/1997 |
| JP | 10-042755 A | 2/1998 |

* cited by examiner

*Primary Examiner*—Emmanuel M Marcelo
(74) *Attorney, Agent, or Firm*—Global IP Counselors, LLP

(57) ABSTRACT

A second sounding mechanism includes a first member, a plurality of concave/convex portions that are formed on an inner peripheral surface of the first member to be spaced apart in the circumferential direction, a second member that is non-rotatably mounted on a spool shaft, a pawl member that is arranged on the second member to be pivotable and contactable with the concave/convex portions, and a pair of urging members that are arranged on both sides of the pawl member and urge the pawl member to a central position by pressing on both sides thereof. The tip of the pawl member is arranged to be contactable with the concave/convex portions, and the concave/convex portions repeatedly contact with the pawl member to produce sounds when the spool is rotated. In a sounding mechanism of a spinning reel, the spool can rotate smoothly, while clear, crisp sounds can be obtained.

18 Claims, 25 Drawing Sheets

SPINNING REEL SOUNDING MECHANISM

BACKGROUND OF THE INVENTION

1. Field of the Invention

The present invention relates to a spinning reel sounding mechanism. More specifically, the present invention relates to a spinning reel sounding mechanism that produces sound by relative rotation between a spool that winds up and releases fishing line and a spool shaft.

2. Background Information

A spinning reel generally includes a reel unit that rotatively supports a handle, a rotor, and a spool that is rotatably mounted to a spool shaft. The spool of the spinning reel is movable back and forth with respect to the reel unit, and includes a bobbin portion onto the outer circumference of which fishing line is wound, and a larger diameter skirt portion provided at a rear end of the bobbin portion. A spool mount that restricts rearward movement of the spool is disposed on a rear end portion of the bobbin portion and is non-rotatably mounted to the spool shaft. The interior of the bobbin portion of a front drag type spinning reel includes a drag mechanism having a plurality of drag plates and a sounding mechanism for producing sound when the drag mechanism operates.

The sound producing mechanism described above that is, for example, disposed in the interior of the drag mechanism, and includes a spring member that is non-rotatably mounted on the spool shaft and a disk-shaped member that makes contact with the spring member and produces sound, is well known in the prior art (see, for example Japanese Utility Model Publication No. H06-16508). The disk-shaped member is mounted on the inner peripheral portion of the bobbin portion, and produces sound when the spring member makes contact with concave/convex portions formed on the inner peripheral side of the disk-shaped member by relative rotation between the disk-shaped member and the spring member.

With the aforementioned conventional spinning reel sounding mechanism, the concave/convex portions are formed on the disk-shaped member, and sound is produced when the drag mechanism operates, i.e. when the spool rotates in the line releasing direction and the spring member comes into contact with the concave/convex portions. However, because the spring member is urged in a vertical direction with respect to the concave/convex portions, when the urging force of the spring member is increased in order to obtain crisp sounds, there will be an increased resistance as the spool rotates and the spring member comes into contact with the concave/convex portions. As a result, there may be large fluctuations in the rotational torque of the spool as sound is produced. If there are large fluctuations in the rotational torque, smooth rotation of the spool will be hindered. On the other hand, if the urging force of the spring member is reduced in order to ensure smooth rotation of the spool, clear, crisp sounds may not be obtained.

In view of the above, it will be apparent to those skilled in the art from this disclosure that there exists a need for an improved sounding mechanism that overcomes the above-described problems of the prior art. This invention addresses this need in the art as well as other needs, which will become apparent to those skilled in the art from this disclosure.

SUMMARY OF THE INVENTION

An object of the present invention is to provide a sounding mechanism of a spinning reel, in which the spool is allowed to be smoothly rotated, and clear, crisp sounds can be obtained.

A sounding mechanism of a spinning reel according to the first aspect of the present invention produces sound by relative rotation between a spool shaft and a spool that winds up and releases fishing line. The sounding mechanism includes a first sounding portion and a second sounding portion. The first sounding portion is non-rotatable with respect to one of the spool and the spool shaft, and has a plurality of concave/convex portions that are formed spaced apart in a circumferential direction on a surface of the first sounding portion. The second sounding portion is non-rotatable with respect to the other of the spool and the spool shaft. The second sounding portion has a pawl member that is pivotably arranged to be contactable with the concave/convex portions, and a pair of urging members that are arranged on both sides of the pawl member to urge the pawl member from both sides thereof. The second sounding portion produces sound when the concave/convex portions contact the pawl member as the spool rotates relative to the spool shaft.

With this sounding mechanism, the pair of urging members that urge the pawl member to a central position are arranged on both sides of the pawl member, and the pawl member is pressed and urged from both sides thereof in the rotational direction, thereby colliding against the concave/convex portions. Because of this, when the pawl member contacts with the concave/convex portions, the resistance in the rotational direction can be reduced because the pawl member will move in the rotational direction due to the urging members. Accordingly, since it will be difficult for large fluctuations in the rotational torque of the spool to occur during sound production, the spool can be smoothly rotated, and clear, crisp sounds can be obtained.

The sounding mechanism according to the second aspect of the present invention is the sounding mechanism of the first aspect of the present invention, in which the first sounding portion is arranged on an inner periphery of the spool so as to be relatively non-rotatable with the spool; and the plurality of concave/convex portions are formed on an inner peripheral surface of the first sounding portion. In this configuration, even clearer and crisper sounds can be produced because, for example, the spool can be formed from a synthetic resin, and the separate first sounding portion can be formed from a metal. In addition, by making the first sounding portion a separate member, it is easy to form the concave/convex portions.

The sounding mechanism according to the third aspect of the present invention is the sounding mechanism of the second aspect of the present invention, in which the first sounding portion is unitarily formed with the spool. In this configuration, by unitarily forming the spool and the first sounding portion from a synthetic resin or a metal, the ease of assembling the spinning reel can be improves, and increases in manufacturing costs can be controlled, because the number of parts can be reduced.

The sounding mechanism according to the fourth aspect of the present invention is the sounding mechanism of the first aspect of the present invention, in which the first sounding portion is non-rotatably arranged with respect to the spool shaft on an outer periphery of the spool shaft, and the plurality of concave/convex portions are formed on an outer peripheral surface of the first sounding portion. Here, as in the first aspect of the present invention, because the pair of urging members that urge the pawl member to a central position are arranged on both sides of the pawl member, the spool can be smoothly rotated and clear, crisp sounds can be obtained.

The sounding mechanism of the fifth aspect of the present invention is the sounding mechanism of any one of the first through fourth aspects of the present invention, in which the first sounding portion is formed from a metal. In this configuration, even cleaner and crisper sounds can be produced by forming the first sounding portion from a metal.

The sounding mechanism of the sixth aspect of the present invention is the sounding mechanism of the fifth aspect of the present invention, in which the concave/convex portions are formed by press working. In this configuration, the concave/convex portions can be formed easily by press working a cylindrical piece of sheet metal from its inside and outside.

The sounding mechanism according to the seventh aspect of the present invention is the sounding mechanism of any one of the first through sixth aspects of the present invention, in which the urging members are coil springs. In this configuration, the pawl member can be urged with an inexpensive structure.

The sounding mechanism according to the eighth aspect of the present invention is the sounding mechanism of the first through seventh aspect of the present invention, in which the coil springs urge the pawl member by pressing the pawl member on both sides. Since the coil springs urge the pawl member by pressing the pawl member as opposed to pulling the pawl member, there is no need to provide an engagement portion at the coil spring or the pawl member. In this manner, it is possible to make the size of the sounding mechanism small.

The sounding mechanism according to the ninth aspect of the present invention is the sounding mechanism of any one of the first through eighth aspects of the present invention, in which the spinning reel includes a front drag mechanism that is disposed in an interior of the spool to regulate rotation of the spool. The first sounding portion and the second sounding portion are mounted in the interior of the front drag mechanism. In this configuration, the first sounding portion and the second sounding portion can be disposed in a space inside the spool, even when the reel is particularly small and there is no space between the rear end portion of the spool and the front end portion of the rotor.

The sounding mechanism according to the tenth aspect of the present invention is the sounding mechanism of the ninth aspect of the present invention, in which the front drag mechanism includes a plurality of drag plates that are non-rotatably mounted on the spool shaft. The second sounding portion is one of the plurality of drag plates. In this configuration, the overall structure of the spinning reel can be simplified because the second sounding portion is also used as a drag plate.

The sounding mechanism according to the eleventh aspect of the present invention is the sounding mechanism of the second aspect of the present invention, in which concave/convex surface portions are formed on an inner periphery of the spool, and the first sounding portion is non-rotatably arranged to the spool by coupling the concave/convex portions of the first sounding portion to the concave/convex surface portions of the spool.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
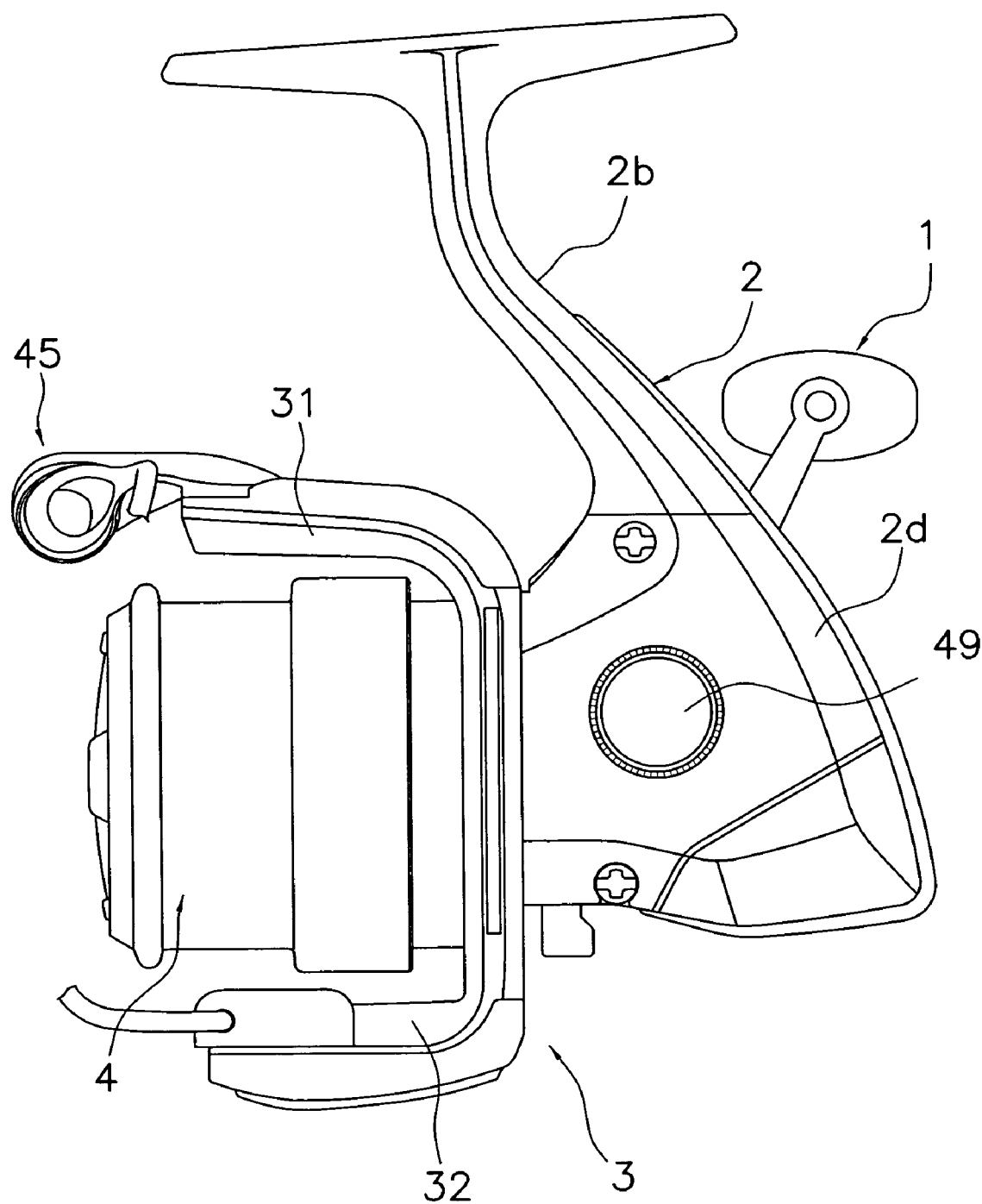
FIG. 1 is a lateral view of a spinning reel in accordance with an embodiment of the present invention.
Figure 2:
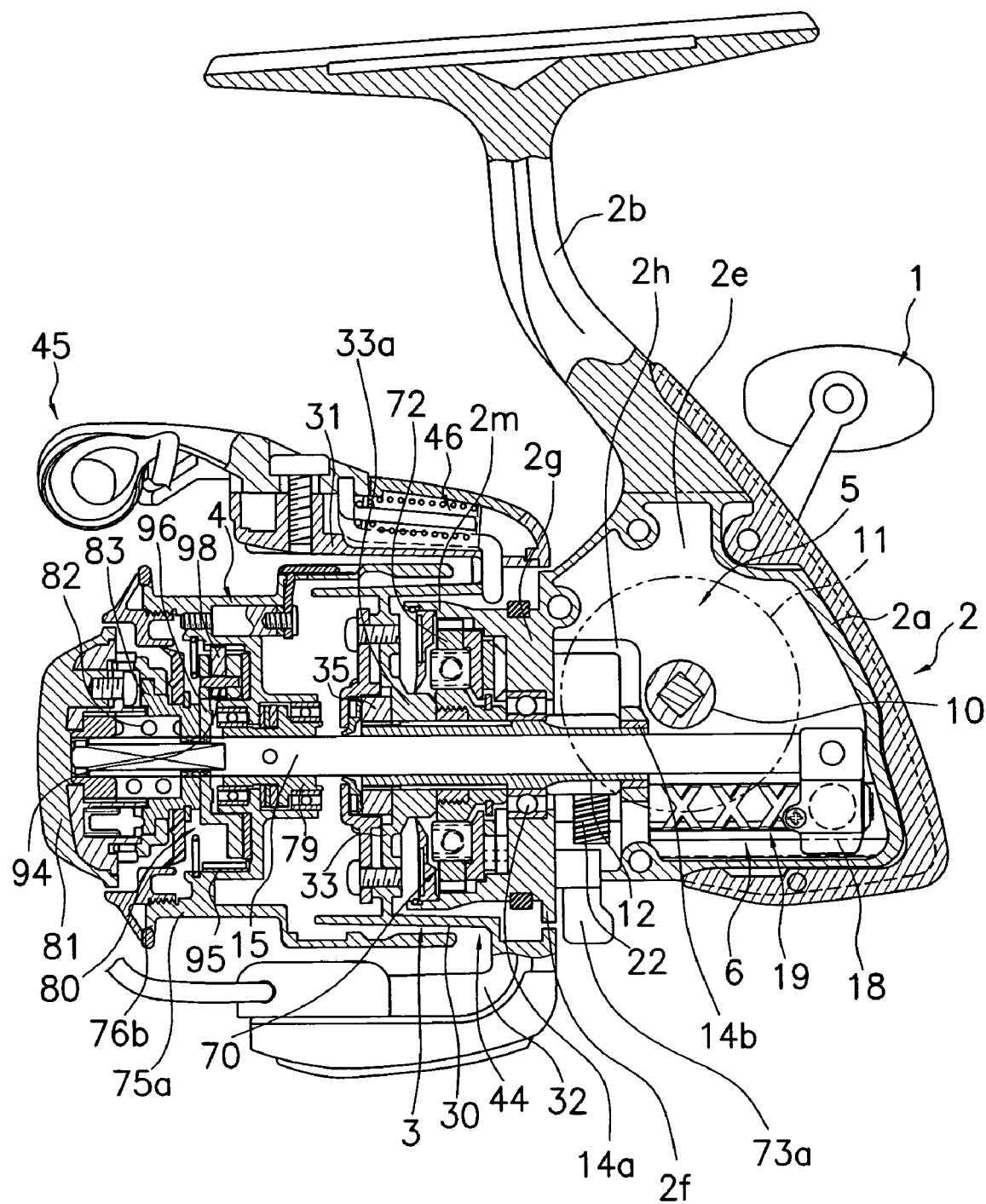
FIG. 2 is a lateral cross-sectional view of the spinning reel in accordance with the embodiment of the present invention.
Figure 3:
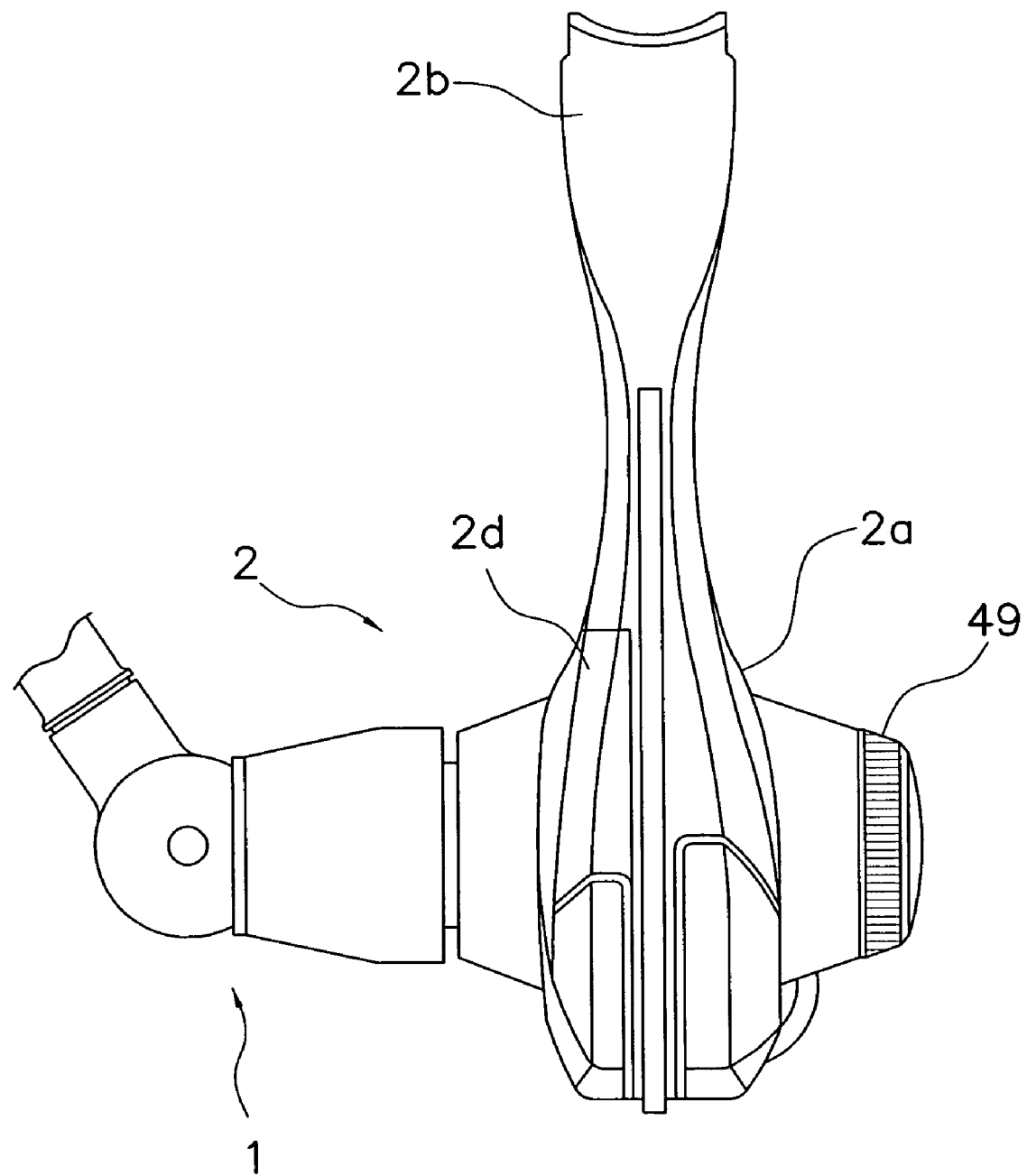
FIG. 3 is a rear view of the spinning reel in accordance with the embodiment of the present invention.

As shown in FIGS. 1 and 2, a spinning reel in which an embodiment of the present invention is applied includes a handle 1, a reel unit 2 that rotatably supports the handle 1, a rotor 3, and a spool 4. The rotor 3 is rotatably supported on the front of the reel unit 2. The spool 4 has fishing line wound around the outer peripheral surface thereof, and is disposed on the front of the rotor 3 so that the spool 4 can be moved forward and backward. Note that as shown in FIGS. 1 and 2, the handle 1 is mounted on the right side, and the handle cap 49 is mounted on the left side. In FIG. 3, the handle is mounted on the left side, while the handle cap 49 is mounted on the right side. Thus, the handle 1 can be mounted on either the left or the right side of the reel body 2.

As shown in FIGS. 1 to 4, the reel unit 3 includes a reel body 2a having an opening 2c on a side portion thereof, a lid 2d that serves to close the opening 2c in the reel body 2a, and a T-shaped rod attachment leg 2b that is formed unitarily with and extends diagonally upward from the reel body 2a.

Figure 4:
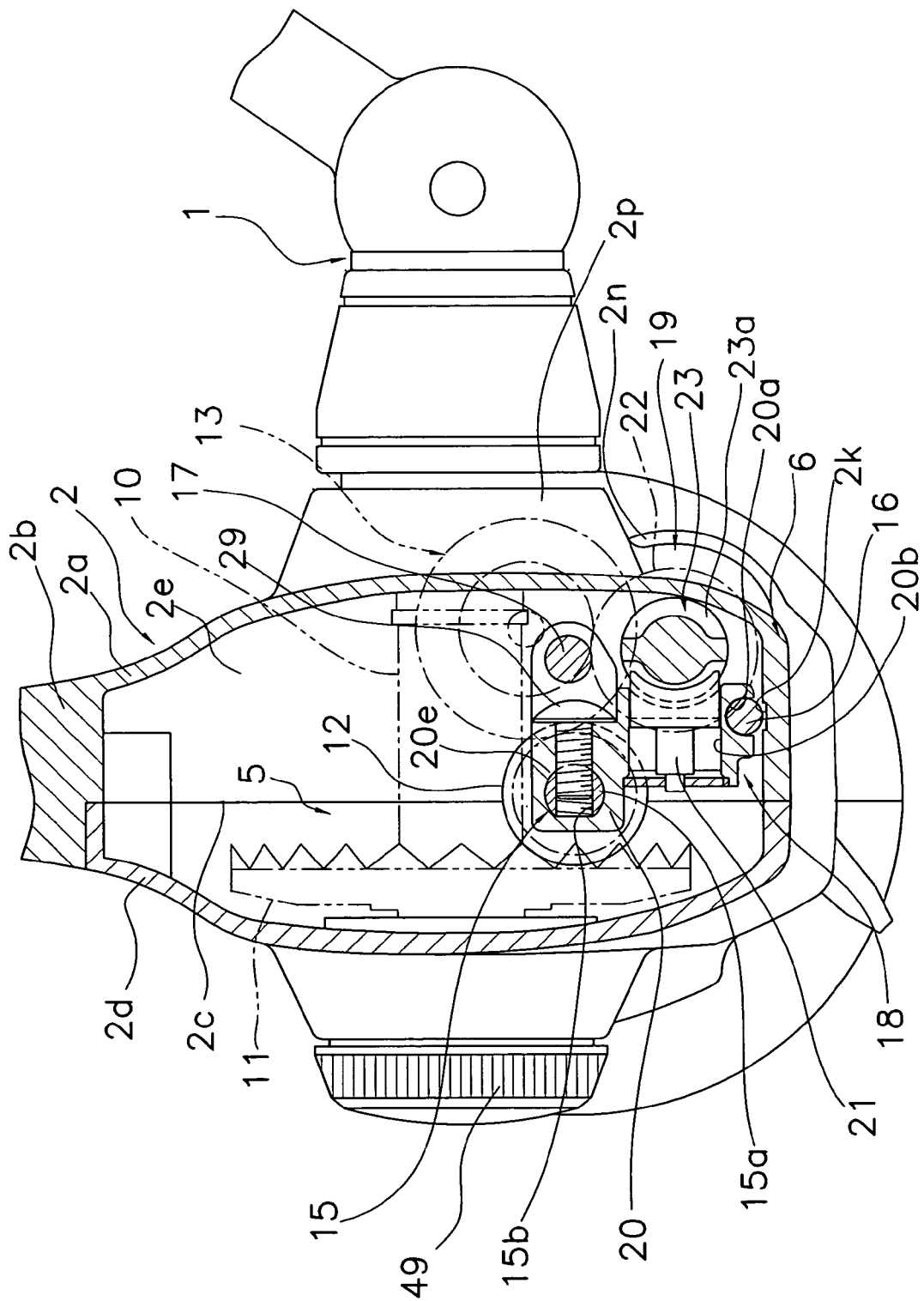
FIG. 4 is a horizontal cross-sectional view of the spinning reel in accordance with the embodiment of the present invention.

As shown in FIGS. 2 and 4, the reel body 2a is made of metal and is formed by die casting, for example, an aluminum alloy or a magnesium alloy. The reel body 2a includes a space 2e in the interior thereof. A rotor drive mechanism 5 that rotates the rotor 3 in association with the rotation of the handle 1 and an oscillating mechanism 6 that serves to move the spool 4 forward and backward to uniformly wind fishing line on the spool 4, are arranged inside this space 2e.

Figure 13:
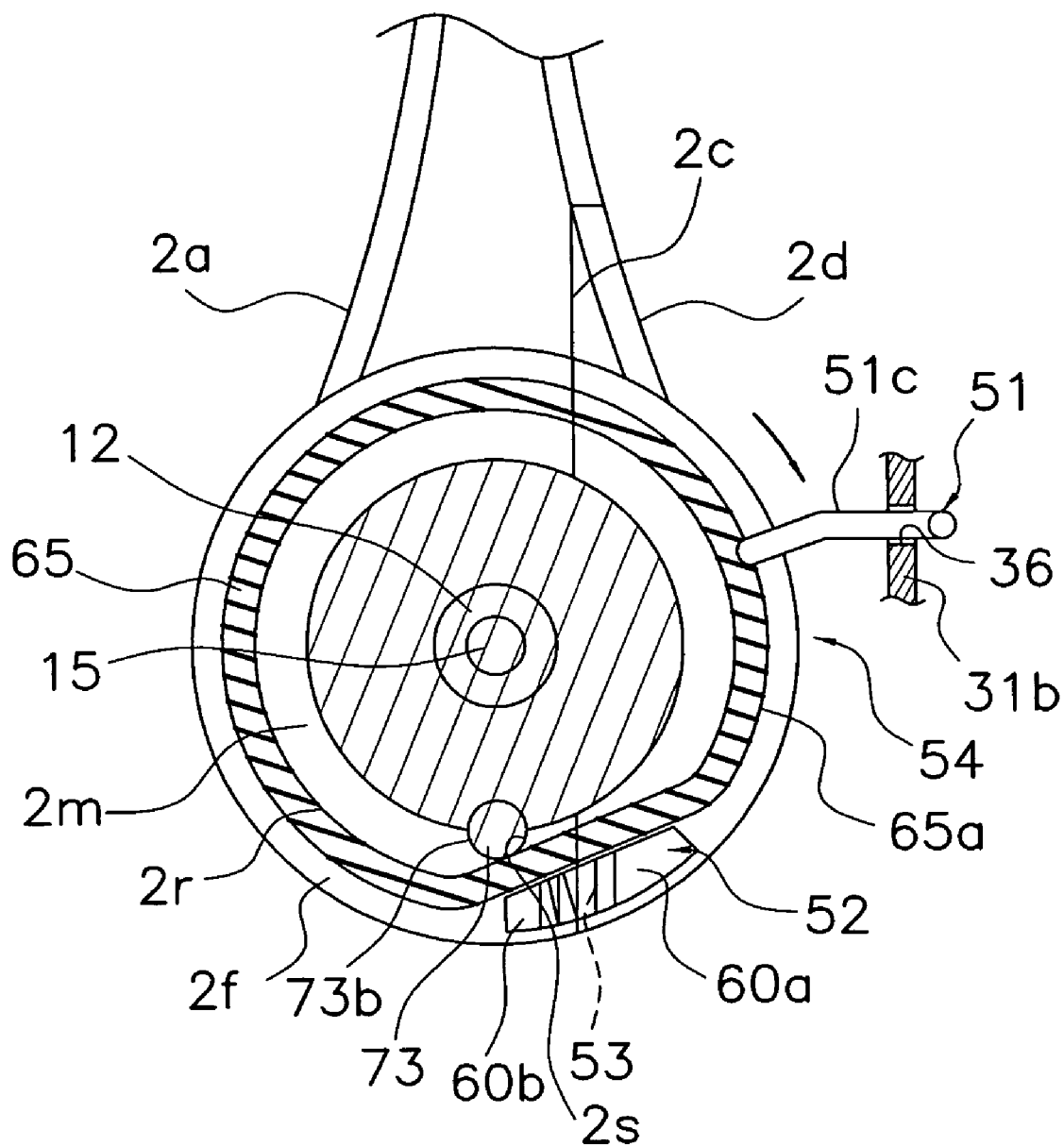
FIG. 13 is a plan view of a reel body showing a bail tripping mechanism of the spinning reel in accordance with the embodiment of the present invention.

A circular flange portion 2f is formed on the front of the reel body 2a so as to cover the rear of the rotor 3 together with the lid 2d. A partition 2g, and a cylindrical portion 2m are formed on the front portion of the flange portion 2f. The cylindrical portion 2m has a diameter that is smaller than that of the flange portion 2f and a tip that is opened. As shown in FIG. 13, a mounting groove 2r is formed adjacent to a front end portion of the flange portion 2f so that a rear end portion of the mounting groove 2r has a cross sectional shape in which a portion of a circle is cut out. A cut-out portion 2s, in which a portion of the rear circular portion of the mounting groove 2r is cut out, is also formed in the cylindrical portion 2e.

Figure 9:
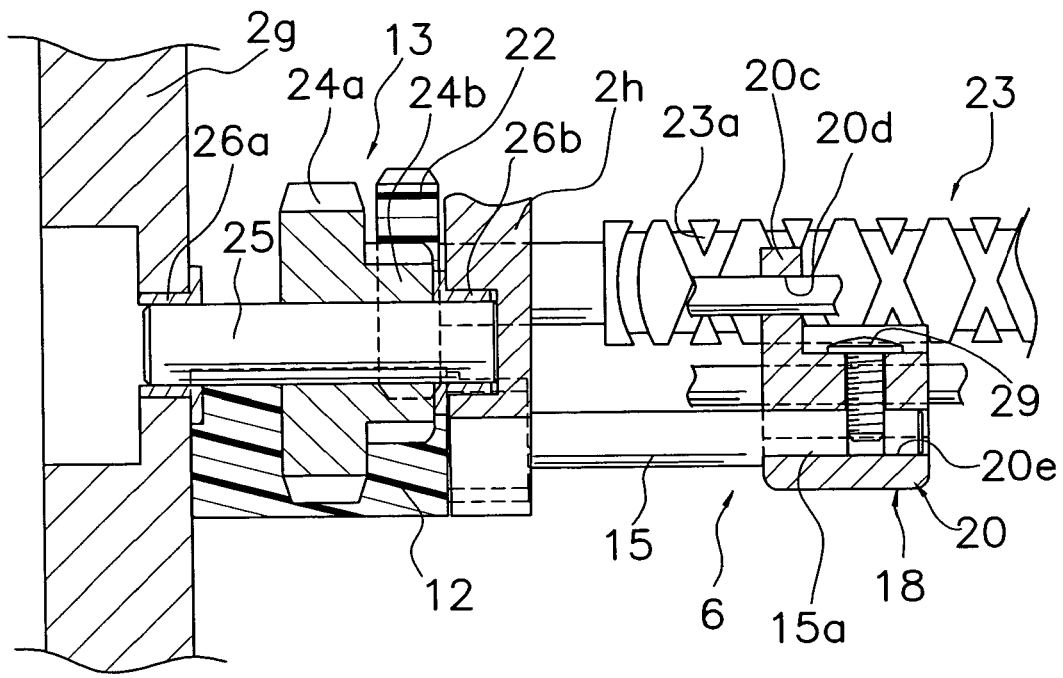
FIG. 9 is a partially broken plan view of the oscillating mechanism of the spinning reel in accordance with the embodiment of the present invention.

In addition, a plate shaped shaft support portion 2h is formed on a rear surface side of a partition 2g of the reel body 2a across a gap to project outward toward the lid 2d. As shown in FIG. 9, a gradual taper is formed in the shaft support portion 2h in which the width thereof narrows toward the tip thereof (the lower end in FIG. 9), such that the shaft support portion 2h can be easily separated during molding. In addition, as shown in FIG. 2, the cylindrical portion 2m is formed on the front portion of the partition 2g to project forward. Furthermore, as shown in FIG. 4, a groove 2k that extends from front to rear is formed in the bottom portion of the reel body 2a.

Figure 14:
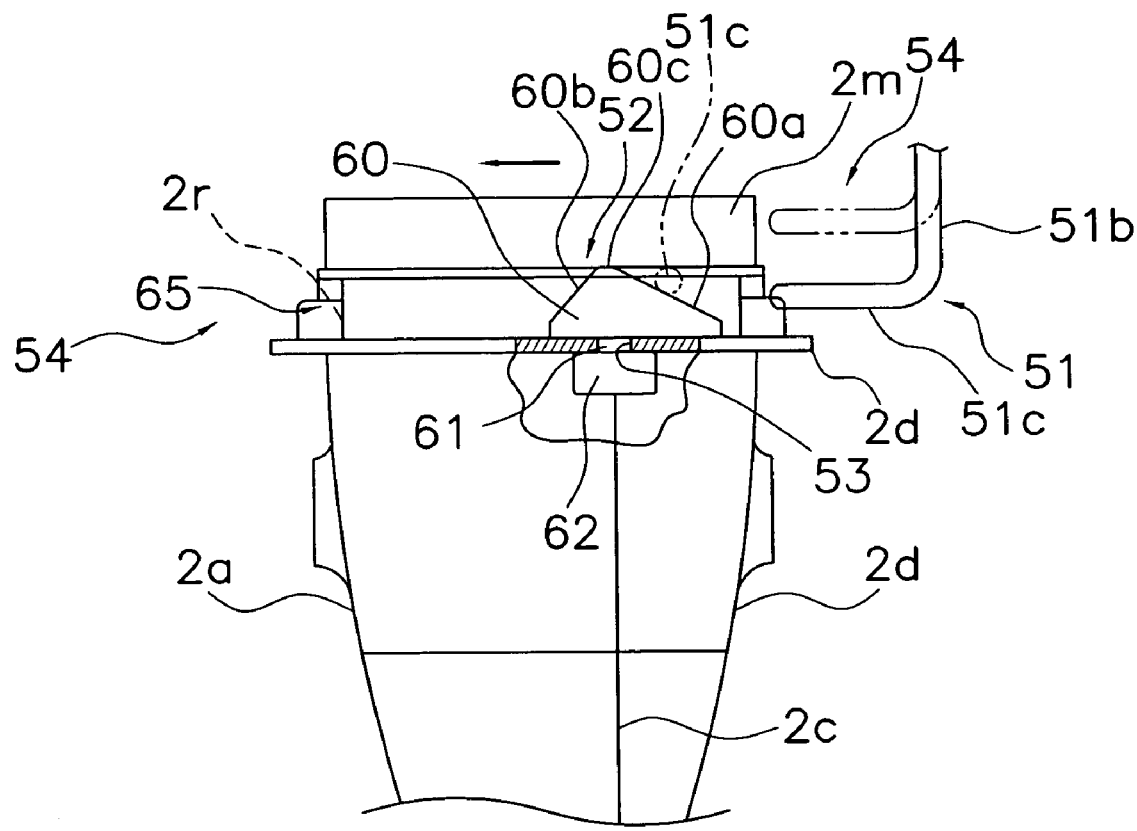
FIG. 14 is a partial bottom view of the reel body showing the bail tripping mechanism of the spinning reel in accordance with the embodiment of the present invention.

The lid member 2b is made, for example, of an aluminum alloy, and for example, is screwed at three locations to the reel body 2a. As shown in FIGS. 13 and 14, a later-described switching member 52 is mounted detachably to the flange portion 2d at a portion where the reel body 2a and the lid member 2b can be separated.

Figure 5:
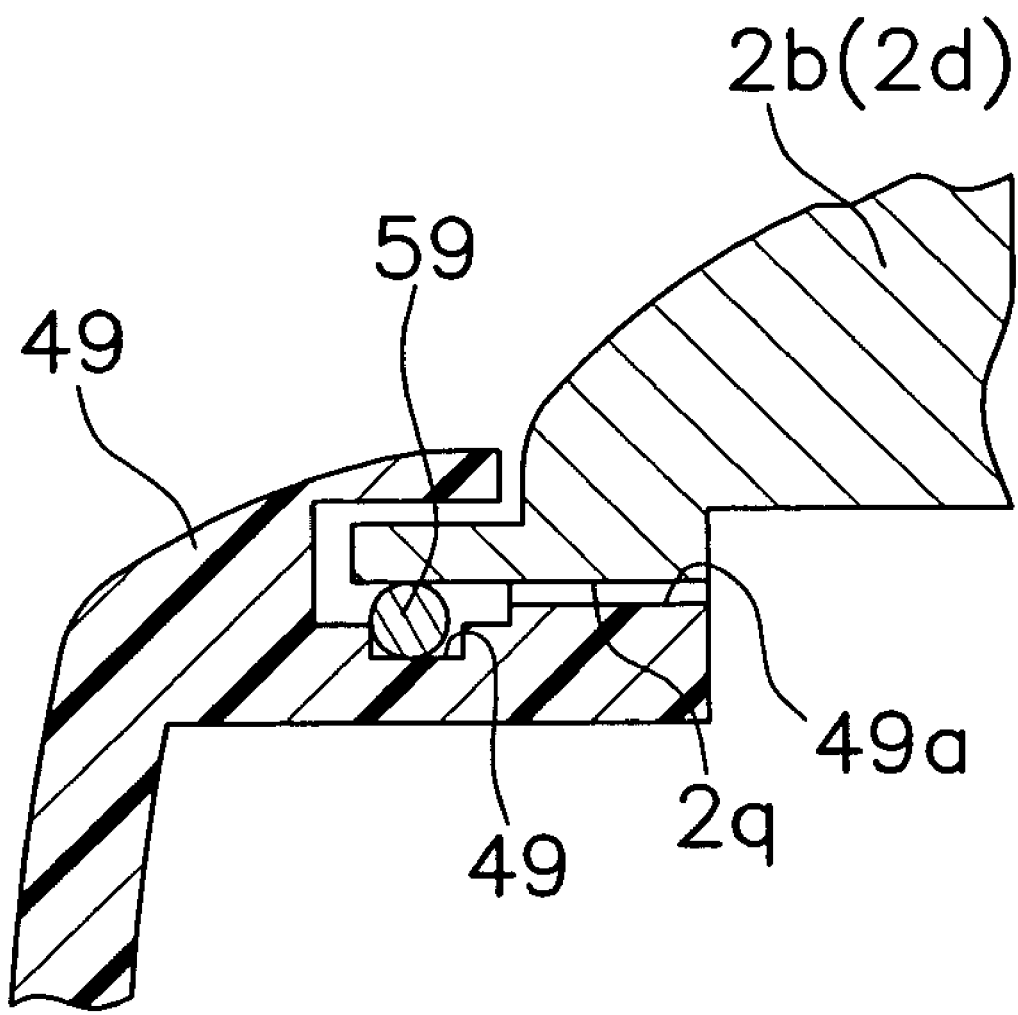
FIG. 5 is an enlarged cross-sectional view of an area around a cap member of the spinning reel in accordance with the embodiment of the present invention.

As shown in an enlarged view in FIG. 5, the handle cap 49 is a cylindrical cap member having a bottom, and includes a male threaded portion 49a that engages with a female threaded portion 2q formed on a side portion of the lid member 2d or the reel body 2a, and an annular groove 49b that is formed in a base end of the male threaded portion 49a. An O-ring 59 made of a synthetic resin is mounted in the groove 49b, and serves to close a gap when the handle cap 49 is mounted on the lid member 2d. By mounting this type of O-ring 59, the handle cap 49 can be locked, and water leakage into the interior can be prevented.

Configuration of the Rotor Drive Mechanism

As shown in FIGS. 2 and 4, the rotor drive mechanism 5 includes a main gear shaft 10 on which the handle 1 is non-rotatively mounted, a main gear 11 (a face gear) that rotates together with the main gear shaft 10, and the pinion gear 12 that meshes with the main gear 11.

Figure 6:
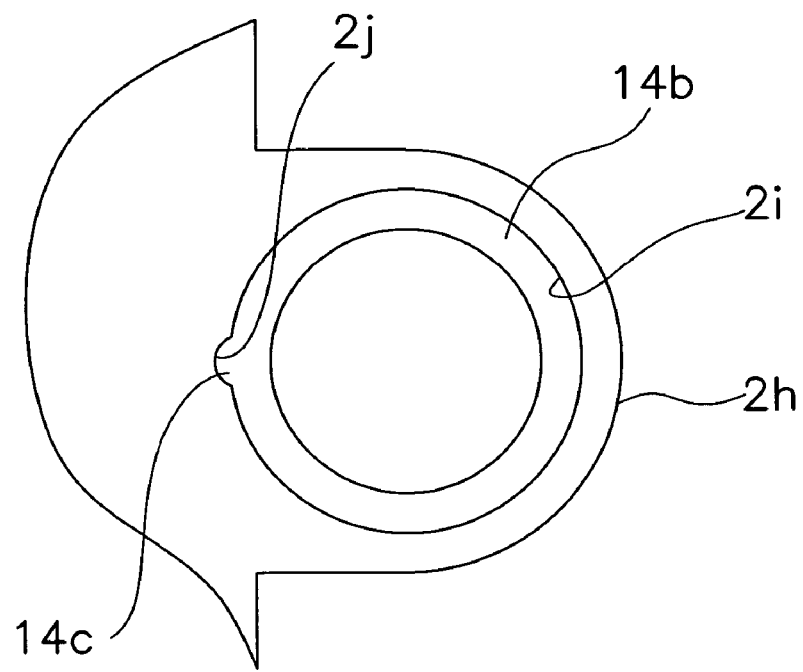
FIG. 6 is an enlarged sectional view of a second bearing that supports a pinion gear in the spinning reel in accordance with the embodiment of the present invention.
Figure 7:
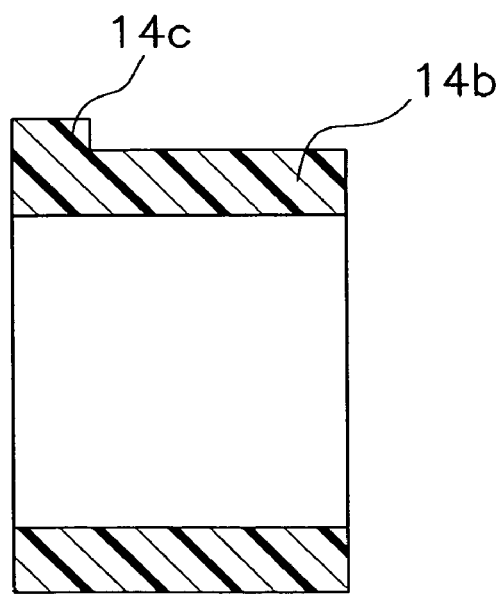
FIG. 7 is a cross-Sectional view of the second bearing in accordance with the present invention.
Figure 8:
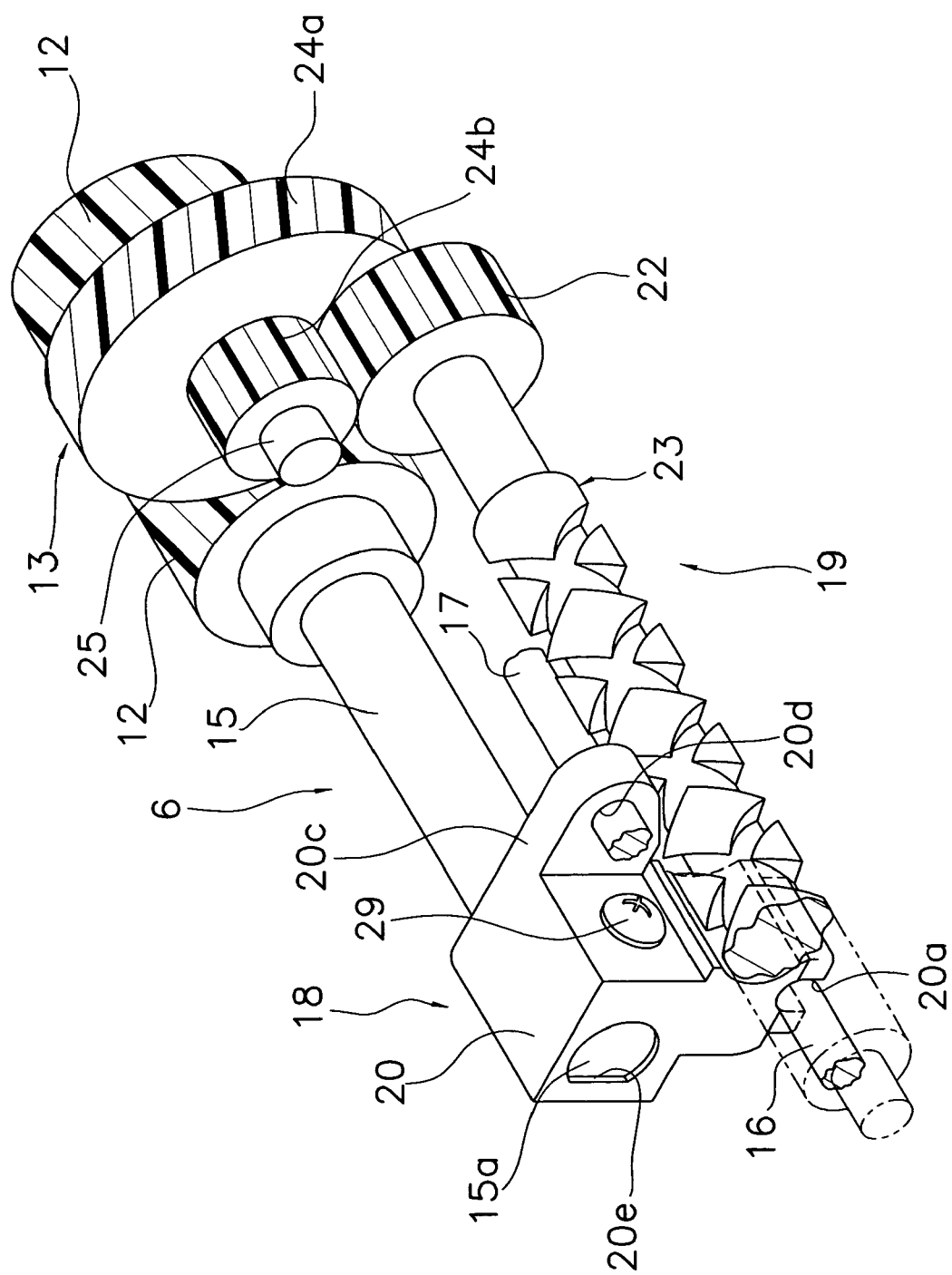
FIG. 8 is an oblique view of an oscillating mechanism of the spinning reel in accordance with the embodiment of the present invention.

The pinion gear 12 is rotatively mounted on the reel body 2a so that the rotation of the pinion gear 12 is different from that of the main gear 11. As shown in FIG. 2, the pinion gear 12 is rotatively supported via bearings 14a and 14b disposed from front to rear. Here, the bearing 14a is mounted on the partition 2g, and is a ball bearing that is subject to a special rust-proofing treatment which modifies the surface of stainless steel and forms a passive layer thereon. The bearing 14b is mounted on the shaft support portion 2h, and is a tubular bush that is made of a synthetic resin. As shown in FIGS. 6 and 7, a rotation prevention projection 14c that projects outward in the radial direction is formed on the outer peripheral surface of an end portion of the bearing 14b. A through hole 2i that the bearing 14b passes through, and a concave portion 2j that engages with the rotation prevention projection 14c, are formed on the bearing support portion 2h. Thus, because the rotation of the bearing 14b is prevented with a simple structure, and rotation prevention is performed in the interior of the shaft support portion 2h, the dimensions of the bearing 14b in the axial direction can be reduced, the support of the pinion gear 12 can be performed in a small space, and the shaft support structure can be reduced in size.

Configuration of the Oscillating Mechanism

The oscillating mechanism 6 reciprocates the spool 4 forward and backward via the spool shaft 15 in association with the rotation of the handle 1. As shown in FIGS. 4 and 8 to 10, the oscillating mechanism 6 includes first and second guide shafts 16, 17 that are disposed to be parallel with the spool shaft 15 such that the spool shaft 15 is disposed therebetween, a slider 18 on which the spool shaft 15 is disposed so as to be non-rotatable and non-movable in the axial direction and which is guided by both guide shafts 16, 17, and a moving mechanism 19 that moves the slider 18 forward and backward in association with the rotation of the handle 1.

The first guide shaft 16 has a portion thereof accommodated in the groove 2k of the reel body 2a, and is mounted on the reel body 2a in parallel with the spool shaft 15. The second guide shaft 17 is disposed above the first guide shaft 16.

The slider 18 includes a slider unit 20 that is guided by the two guide shafts 16, 17, and an engagement pin 21 that is rotatively mounted on the slider unit 20. The slider unit 20 includes a guide groove 20a that is formed in a position facing the groove 2k and covers the first guide shaft 16 from three directions. The guide groove 20a may only suppress the rotation of the second guide shaft 17 of the slider unit 20 that is guided by the second guide shaft 17, and thus the guide groove 20a may be configured so as to cover the first guide shaft 16 from three directions. Note that in this embodiment, a slight gap is formed between the first guide shaft 16 and the guide groove 20a. Thus, wobbling will be suppressed, and the slider unit 20 will be smoothly guided by the first guide shaft 16.

In addition, the slider unit 20 includes an accommodation hole 20b that accommodates the engagement pin 21 so as to allow rotation thereof at a predetermined rotational angle, and a guide portion 20c in which a guide hole 20d is formed and through which the second guide shaft 17 passes. Furthermore, the slider unit 20 has an attachment hole 20e formed therein that has a shape in which a portion of the edge thereof has been cut out. The rear end portion of the spool shaft 15 is non-rotatably mounted in the attachment hole 20e. The rear end portion 15a of the spool shaft 15 that is mounted in the attachment hole 20e has a shape in which a portion of the outer peripheral surface thereof is cut out with a surface that is parallel with the shaft, so that the rear end portion 15a will engage with the attachment hole 20e. In addition, a screw hole 15b is formed in the rear end portion of the spool shaft 15, and a round head screw 29 is screwed therein from the right side of FIG. 4, i.e., is passed through the slider unit 20 from the second guide shaft side 17. Thus, the slider unit 20 can be non-rotatably fixed in the rear end portion 15a of the spool shaft 15.

Here, the first guide shaft 16 can be placed near the bottom portion side of the reel unit 2 because a portion of the first guide shaft 16 is accommodated in the groove 2k formed in the bottom of the reel body 2a, and the guide groove 20a provided in the slider unit 20 is supported in at least two points on the first guide shaft 16. Because of this, the second guide shaft 17 can be separated from the first guide shaft 16 as much as possible, and wobble of the slider 18 can be suppressed as much as possible.

The moving mechanism 19 includes an intermediate gear 13 that meshes with the pinion gear 12, a driven gear 22 that meshes with the intermediate gear 13, and a worm shaft 23 on which the driven gear 22 is non-rotatably mounted.

The intermediate gear 13 is a stepped gear, and is provided in order to greatly decelerate the rotation of the pinion gear 12 and transmit the rotation to the driven gear 22. As shown on FIGS. 9 and 10, the intermediate gear 13 is disposed in a space between the partition 2g and the shaft support portion 2h. The intermediate gear 13 includes a large diameter gear 24a, and a small diameter gear 24b that is disposed to the rear of the large diameter gear 24a. The intermediate gear 13 is rotatively mounted on the reel body 2a to rotate in parallel with the pinion gear 12. The intermediate gear 13 is rotatively supported on a mounting shaft 25 whose both ends are supported by the partition 2g and the shaft support portion 2h. Brimmed bushes 26a, 26b are mounted on both ends of the mounting shaft 25. Thus, it will be difficult for unusual forces to be applied to the intermediate gear 13 because the end surface of the intermediate gear 13 will no longer come into contact with the shaft support portion 2h on which a taper is formed. In addition, the mounting shaft 25 is easily assembled because it will no longer be necessary to interpose a washer between the intermediate gear 13 and the shaft support portion 2h.

The large diameter gear 24a of the intermediate gear 13 is a screw gear that meshes with the pinion gear 12, and has more teeth than the pinion gear 12. The large diameter gear 24a is formed, for example, by die casting. The small diameter gear 24b is a helical gear disposed to be concentric with the large diameter gear 24. The driven gear 22 is a helical gear that meshes with the small diameter gear 24b, and has fewer teeth than the driven gear 22.

Figure 10:
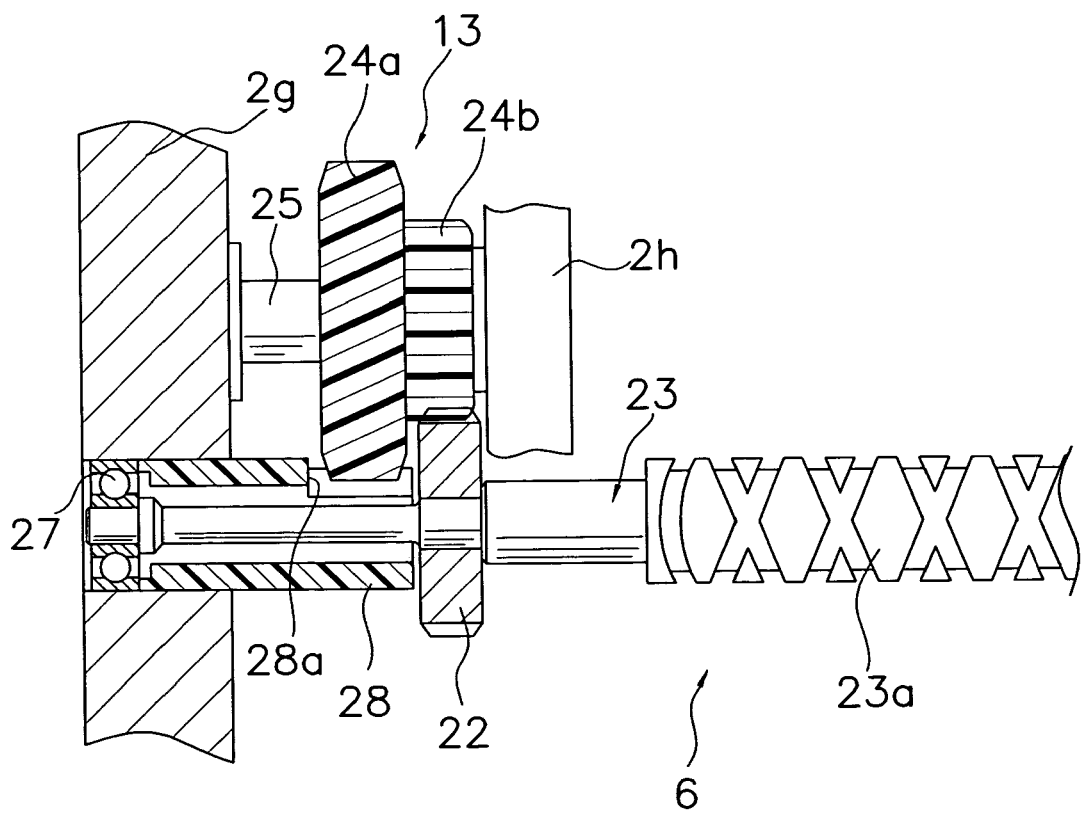
FIG. 10 is a partially broken lateral view of the oscillating mechanism of the spinning reel in accordance with the embodiment of the present invention.

The worm shaft 23 is disposed parallel to the spool shaft 15, and is rotatively supported by the reel body 2a. In addition, spiral intersecting grooves 23a are formed around the outer peripheral portion of the worm shaft 23. The tip of the engagement pin 21 engages with the grooves 23a, and the slider 18 reciprocates through the rotation of the worm shaft 23. As described above, the driven gear 22 is non-rotatively mounted on the worm shaft 23. As shown in FIG. 10, the tip of the worm shaft 23 is rotatively supported on the partition 2g by a bearing 27 that is mounted on the partition 2g. Note that because the large diameter gear 24a of the intermediate gear 13 is disposed more forward than the small diameter gear 24b that meshes with the driven gear 22, the driven gear 22 will be far from the bearing 27 and the worm shaft 23 will easily wobble. In order to reduce the wobbling of the worm shaft 23, a bush 28 is mounted between the bearing 27 and the driven gear 22. A cut-out portion 28a is formed in the bush 28 in order to avoid interference with the large diameter gear 24a.

Here, by positioning the large diameter gear 24a more forward than the small diameter gear 24b, a bulging portion 2n (FIG. 4) of the reel body 2a will be positioned to the front of a handle attachment boss 2p (FIG. 4) due to the large diameter gear 24a. Because of this, interference between the bulging portion 2n and the handle attachment boss 2p can be avoided. Thus, the size of the reel unit 2 can be reduced.

Structure of the Rotor

As shown in FIG. 2, the rotor 3 includes a rotor unit 44, a bail arm 45 that is mounted on the front end of the rotor unit 44 and pivotable between a line-releasing posture and a line-winding posture, and a bail tripping mechanism 46 that is mounted to the rotor unit 44 and serves to return the bail arm 45 from the line-releasing posture to the line-winding posture.

The rotor unit 16 includes a cylindrical portion 30 that is mounted to the reel body 2a so that it can rotate freely around the spool shaft 15, and a first rotor arm 31 and a second rotor arm 32 that are arranged opposite one another on the sides of the cylindrical portion 30. The cylindrical portion 30, the first rotor arm 31 and the second rotor arm 32 are unitarily formed and made of, for example, an aluminum alloy.

A front wall 33 is formed at the front part of the cylindrical portion 30, and a boss 33a is formed in the center of the front wall 33. A through hole is formed in the center of the boss portion 33a, and a front portion 12a of the pinion gear 12 and the spool shaft 15 pass through this through hole. A nut 13 is provided for fixing the rotor 3 on the front part of the front wall 33. A rear surface of the cylindrical portion 30 is covered by a third cover member 30a.

Figure 11A:
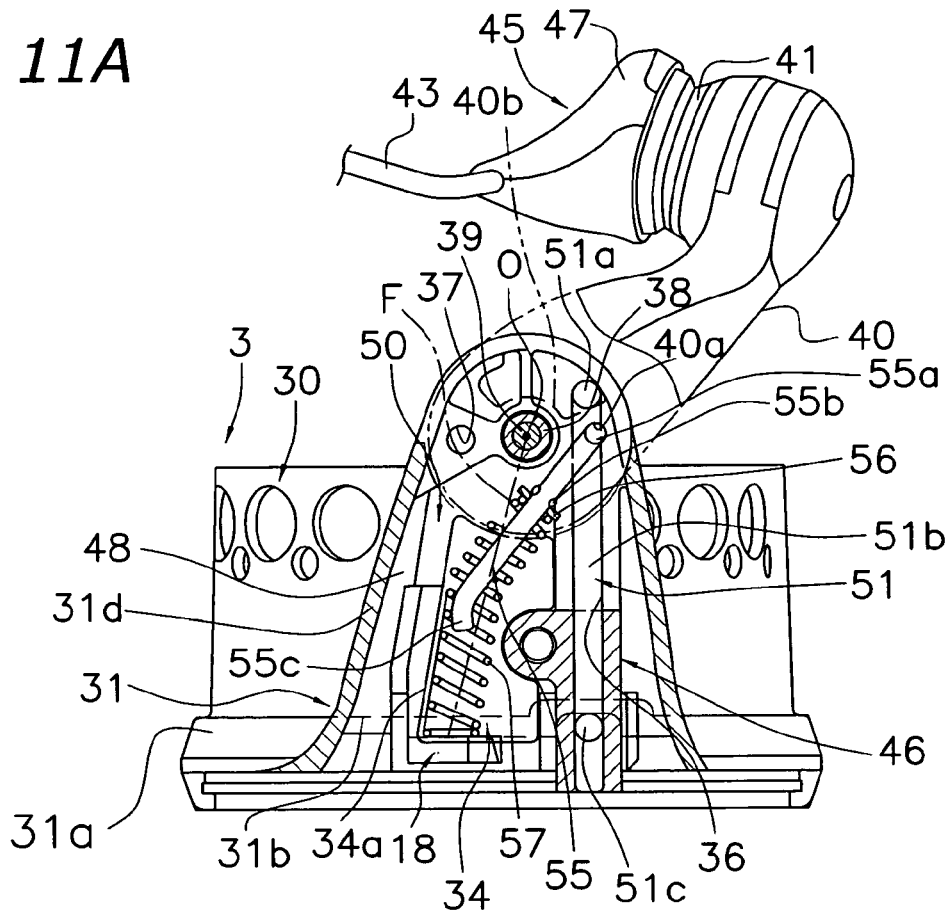
FIG. 11 is a plan view of a first rotor arm of the spinning reel in accordance with the embodiment of the present invention.
Figure 11B:
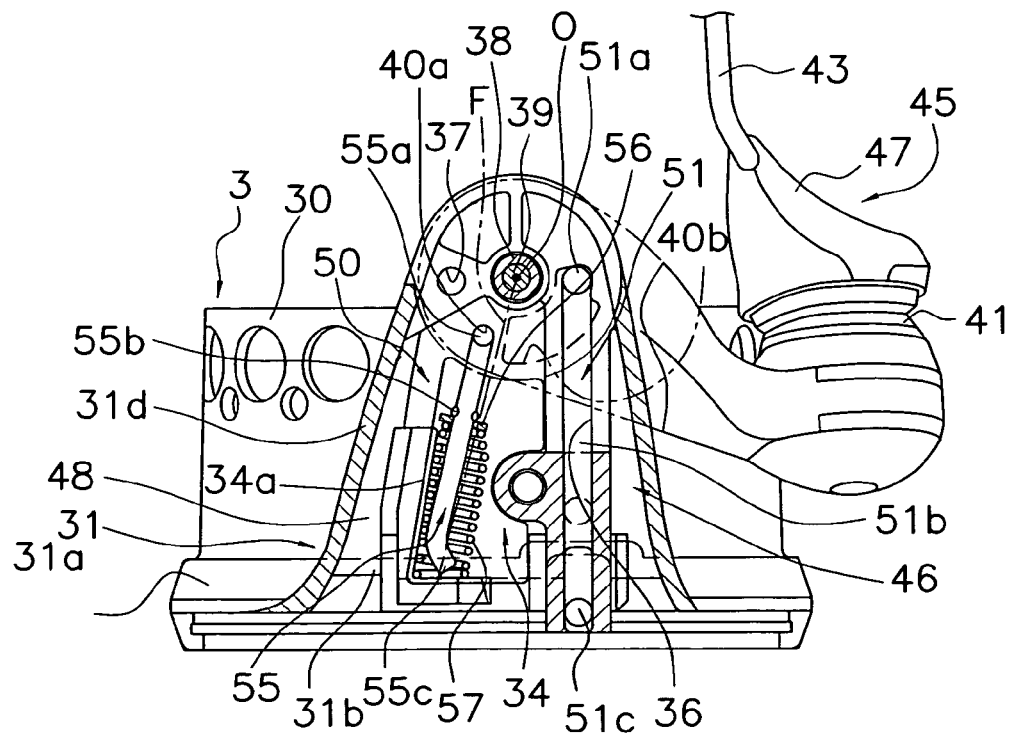
Figure 12:
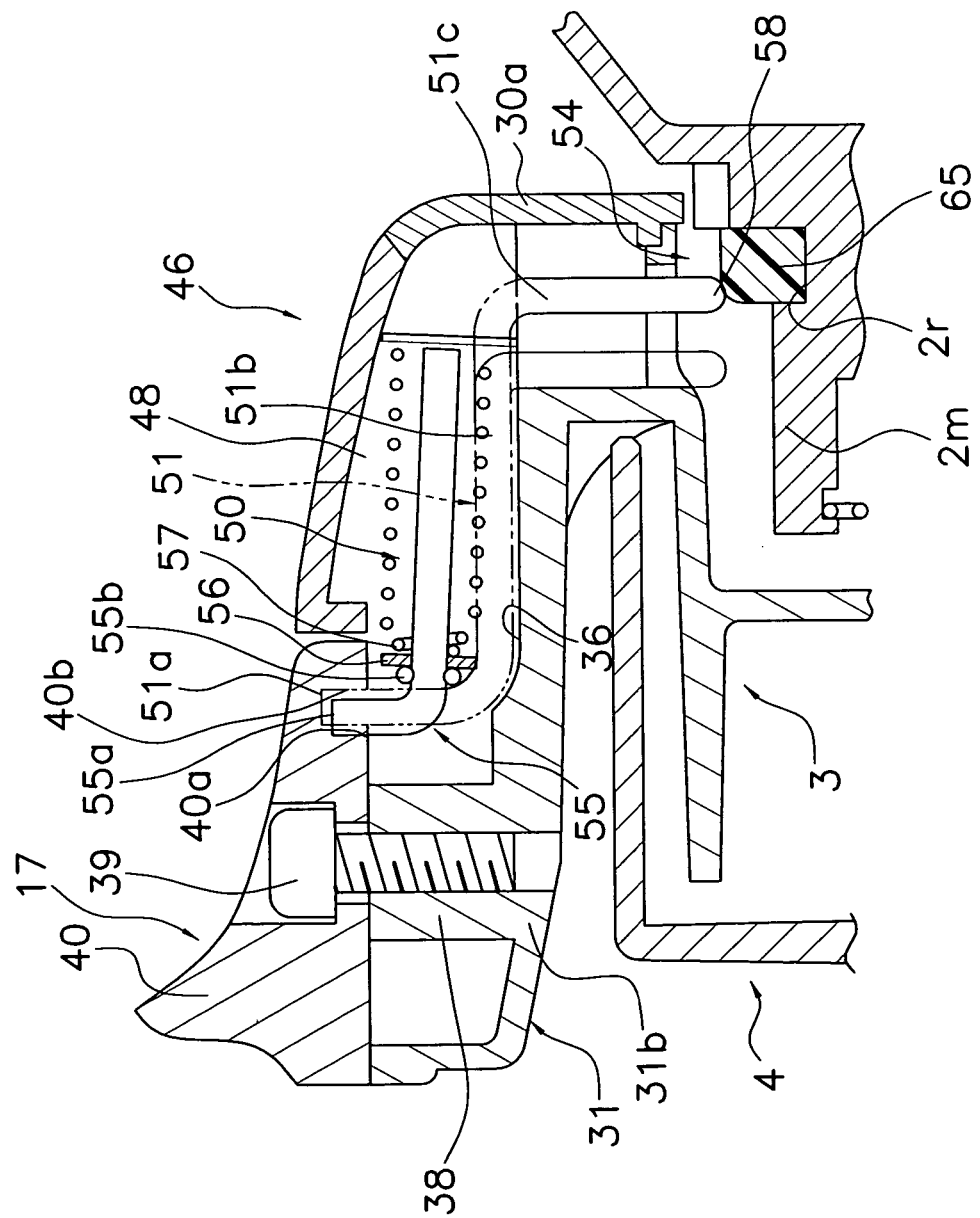
FIG. 12 is an enlarged cross-sectional view of the first rotor arm of the spinning reel in accordance with the embodiment of the present invention.

As shown in FIGS. 2, 11 and 12, the first and second rotor arms 31 and 32 respectively include first and second connection portions 31a and 32a arranged on the outer peripheral surface of the rear portion of the cylindrical portion 30, first and second arm portions 31b and 32b that curve outward and extend forward from the first and second connection portions 31a and 32a, and first and second cover members 31c and 32c that cover the outer portions of both of the two connection portions 31a and 32a and the two arm portions 31b and 32b. The first and second connection portions 31a and 32a are each formed in smooth continuity with the cylindrical portion 30 in the circumferential direction.

The first and second arm portions 31b, 32b are formed in smooth continuity with the first and second connection portions 31a, 32a, and extend frontward spaced apart from the cylindrical portion 30. The first and second arm portions 31b and 32b form a smooth curve from their tips to the portion where they are connected to the cylindrical portion 30. Apertures 31d, 32d are respectively formed in outer portions of the two connection portions 31a and 32a and the two arm portions 31b and 32b. The first and second cover members 31c, 32c respectively close the apertures 31d, 32d from outside. An accommodation space 48 is formed between the first cover member 31c, the first connection portion 31a, and the first arm portion 31b.

A first bail support member 40 is pivotably mounted to the outer peripheral side of the front end of the first arm portion 31b. As shown in FIGS. 11 and 12, a long and narrow guide groove 36 that serves to guide a later-described moving member 51 of the bail tripping mechanism 46, a mounting hole 37 to which a restriction mechanism (not shown) for conferring resistance to the bail arm 17 is mounted, and a boss 38 having a screw hole therein for pivotably mounting the first bail support member 40, are formed on the first arm portion 31b. A second bail support member 42 is pivotably mounted to the inner peripheral side of the front end of the second rotor arm 32b.

The first bail support member 40 is attached to the first rotor arm 31b with a threaded attachment pin 39 that is screwed into the boss 38 of the first arm 31b. The attachment pin 39 is a bolt with a hexagonal hole having few snags, and thus it is difficult for fishing line to get caught at the head thereof.

As shown in FIG. 11, a line roller 41 for guiding fishing line to the spool 4, and a fixed shaft cover 47 that is fixed to the first bail support member 40, are mounted on the front end of the first bail support member 40, with the line roller 41 being arranged between the first bail support member 40 and the fixed shaft cover 47. The line roller 41 is mounted rotatively to the front end of the first bail support member 40. The fixed shaft cover 47 have a deformed cone shape with a pointed tip. A bail 43 formed by bending a wire into an approximate U-shape is fixed between the front end of the fixed shaft cover 47 and the second bail support member 42. The first and second bail support members 40 and 42, the line roller 41, the bail 43, and the fixed shaft cover 47 form the bail arm 17 for guiding the fishing line to the spool 4. The bail arm 17 can pivot between the line-winding posture shown in FIG. 11(a) and the line-releasing posture shown in FIG. 11(b), which flips from the line-winding posture.

The bail tripping mechanism 46 is disposed within the accommodation space 48 in the first rotor arm 31. The bail tripping mechanism 46 restores the bail arm 17 from the line-releasing posture to the line-winding posture in cooperation with the rotation of the rotor 3 and maintains the bail arm 17 in these two postures.

As shown in FIGS. 11 to 14, the bail tripping mechanism 46 includes a toggle spring mechanism 50 mounted within the accommodation space 48 and pivotably mounted to the first arm portion 31b, a moving member 51 mounted within the accommodation space 48 so that it is moveable approximately back and forth, a switching member 52 mounted detachably on a flange portion 2d so that it can contact the moving member 51, a rotor braking device 54 that has a braking member 65 (an example of an annular member) for braking the rotor 3, and a restriction mechanism 75 that restricts the bail arm 17 from returning to the line-winding posture when in the line-releasing posture.

As shown in FIG. 11, the toggle spring mechanism 50 is arranged inside the first rotor arm 31 so that it can take a first position in which the bail arm 17 is in the line-winding posture and a second position in which the bail arm 17 is in the line-releasing posture. The toggle spring mechanism 50 serves as a mechanism for maintaining the bail arm 17 in the line-winding posture or the line-releasing posture. The toggle spring mechanism 50 includes a rod 55 and a coil spring 57. One end of the rod 55 is interlocked with the first bail support member 40 and the other end extends along the first arm portion 31b. The coil spring 57 urges the rod 55 outward.

As shown in FIG. 12, the front end of the rod 55 has an interlocking portion 55a that is bent over towards the first bail support member 40 so as to interlock with an engagement hole 40a of the first bail support member 40. The rod 55 also includes an interlocking protrusion 55b in its intermediate position for interlocking with the front end of the coil spring 57, and a bent portion 55c on its rear end that is bent slightly. A washer 56 against which the front end of the coil spring 57 abuts is mounted to the interlocking protrusion 55b, and thus power from the front end of the coil spring 57 is uniformly transmitted to the rod 55. The rod 55 is disposed such that the rear portion thereof is tilted radially inward.

The coil spring 57 is guided by contacting a guiding sheet 34 made of a synthetic resin such as a polyamide resin that is mounted to the first arm portion 31b. The guide sheet 34 includes a wall portion 34a that is bent so that it guides one side surface of the coil spring 57 and interlocks with the base end thereof. The wall portion 34a has a height that allows it to contact the lateral portion and the base end of the coil spring 57. The coil spring 57 is arranged so as to slope radially inward toward the rear.

The front end of the coil spring 57 with which the washer 56 interlocks has a smaller coil diameter than the other portions thereof. Thus, at the other portions besides the front end, the coil spring 57 is not easily deformed even when a large gap is created between the coil spring 57 and the rod, and it is not easy for the rod 55 to change its posture inside the coil spring 57. Note that it is also possible to interlock the base portion of the coil spring 57 by providing a cover portion and the like that covers the boss portion contacting the inner peripheral surface of the base portion of the coil spring 57 and the outer peripheral surface of the base portion. Furthermore, it is also possible to mount the boss portion and cover portion to the first arm portion 31b, so that they are pivotable around an axis parallel to the pivot axis of the first bail support member 40. For example, it is conceivable that a circular arc-shaped protrusion is formed on the base end surface of the boss portion, and a circular arc-shaped recess engaging the circular arc-shaped protrusion is formed inside the first arm portion 31*b*, whereby the boss portion is pivotable.

The toggle spring mechanism 50 in this manner is arranged so that the positions at which the rod 55 is engaged with the first bail support member 40 in the line-winding posture and the line-releasing posture are different with respect to a line segment F connecting the coil spring 57 which is the axis of the pivot shaft, the central position of the base end, and the pivot axis O of the first bail support member 40 (the axis of the attachment pin 39). A dead point of the toggle spring mechanism 50 (the position at which the coil spring 57 is most compressed) is a position lying on the line segment F. Thus, the toggle spring mechanism 50 can toggle the bail arm 17 between the two postures interposed by a dead point, can bias the bail arm 17 toward both postures, and can maintain the bail arm 17 in both postures. The dead point of the toggle spring mechanism 50 is shifted toward the line-releasing posture.

The shifting member 51 is, for example, a wire made of metal such as stainless steel, and its two ends are bent to 90 degree angles which point in different directions. The moving member 51 is mounted on the first arm portion 31*b* such that it can be moved approximately back and forth between a first position (withdrawn position) shown in FIG. 11(*a*) and a second position (contact position) shown in FIG. 11(*b*). As shown in FIGS. 11 to 14, a front end portion 51*a* of the moving member 51 is bent outward, and interlocked with a fan shaped engagement groove 40*b* formed on the first bail support member 40. A central portion 51*b* extends along the first arm portion 31*b* radially inward of the rod 55.

A rear end portion 51*c* passes through a guide groove 36, extends inward to a position where it slightly overlaps the front end surface of the braking member 65 that forms the rotor braking device 54, and has a rear end surface that is slightly rounded. The width of the guide groove 36 is approximately the same as the diameter of the moving member 51. Therefore, the inner side in the radial direction of the central portion 51*b* of the moving member 51 is guided back and forth along the guide groove 36 as the bail arm 17 pivots.

When the bail arm 17 is in the line-releasing posture, the engaging end of the moving member 51 that interlocks with the engagement groove 40*b* is positioned further toward the line-winding posture side than a line connecting the rear end portion 51*c* and the pivot center of the bail arm 17. That is to say, the moving member 51 is positioned so that in both the first position (withdrawn position) and the second position (contact position), the location where it is interlocked with the first bail support member 40 is in the same direction as the line connecting the axis of the rear end portion 51*c* in the contact position (FIG. 11*b*) with the pivot axis of the first bail support member 40. Thus, when the switching member 52 presses against the rear end portion 51*c* of the moving member 51, the first bail support member 40 can be restored to the line-winding posture. In this second position (contact position), the end surface of the rear end portion 51*c* extends downward beyond the front end surface of the braking member 65 and slightly inward from the outer peripheral surface thereof.

The switching member 52 is made of a synthetic resin, such as a polyamide resin or polyacetal, and as shown in FIGS. 13 and 14, it is detachably mounted on the flange 2*d* at a portion which separates the reel body 2*a* from the lid member 2*b*. A rectangular cut-out 53 is formed on the portion where the reel body 2*a* and the lid member 2*b* are separated from each other. The switching member 52 includes a cone-shaped cam portion 60 having two oblique surfaces 60*a*, 60*b*, a neck portion 61 integrally formed with the cam portion 60, and a brim portion 62. The oblique surface 60*a* is an inclined surface whose downstream side in the line-winding rotation direction (shown by the arrow in FIG. 6) of the rotor 3 projects forward toward the rotor 3 more than the upstream side thereof does. The degree to which the oblique surface 60*b* protrudes diminishes from the protruding portion of the oblique surface 60*a* toward the downstream side in the line-winding direction. A projecting tip 60*c* is the highest forward projecting point of the oblique surfaces 60*a*, 60*b*, and the amount that it protrudes forward is set such that it exceeds the dead point of the toggle spring mechanism 50 when the rear end portion 51*c* of the moving member 51 contacts the oblique surface 60*a* and pushes the bail arm 17 toward the line-winding posture.

The neck portion 61 is of a size that can be fitted into the cut-out 53, and a gap that is approximately the same dimension as the wall thickness of the flange portion 2*d* is formed between the cam portion 60 and the brim portion 62. The brim portion 62 has a larger cross-section than the neck portion 61, and contacts the rear surface of the flange portion 2*d*. When the oblique surface 60*b* is provided and the bail arm 17 is in the line-releasing posture, even if the rotor 3 is forced to rotate in reverse (rotation in the line release direction) and the moving member 51 contacts the switching member 52, the moving member 51 of the bail tripping mechanism 46 is guided smoothly by the oblique surface 60*b* of the switching member 52, and thus it is not easily damaged. Note that this type of switching member 52 having the two inclined surfaces 60*a*, 60*b* may be adapted in a switching portion formed integrally with the reel unit 2.

When the lid member 2*b* is attached to the reel body 2*a*, the switching member 52 can be fixed to the reel body 2*a*, for example, simply by fitting the neck portion 61 into the cut-out 53 on the side of the reel body 2*a* and fastening the lid member 2*b* on the reel body 2*a* with screws.

The rotor braking device 54 serves to brake the rotor 3 when the bail arm 17 pivots to the line-releasing posture, and includes the moving member 51 and the braking member 65 mounted on the mounting groove 2*f* formed on the base end side of the cylindrical portion 2*e*. In other words, the moving member 51 is not only part of a bail tripping mechanism 46, but also part of the rotor braking mechanism 54.

The braking member 65 is provided in order to brake the rotation of a rotor 3 when the bail arm 17 is in the line-releasing posture. The braking member 65 is a resilient, annular member composed of synthetic rubber, such as styrene-butadiene rubber (SBR), acrylonitrile-butadiene rubber, butadiene rubber, isoprene rubber, chloroprene rubber, silicone rubber or urethane rubber. As shown in FIG. 12, the outer periphery of the braking member 65 is in contact with the rear end portion 51*c* of the moving member 51 and frictionally slides thereon, and the inner periphery of the braking member 65 is non-rotatably mounted in the mounting groove 2*f*. Note that the inner periphery of the braking member 65 is in contact with the outer periphery of the stopper shaft 73 (described later), and also functions as an annular member that prevents wobbling of the stopper shaft 73.

In the bail tripping mechanism 46 configured in this manner, the toggle spring mechanism 50 can be toggled between a first position shown in FIG. 11(*a*) and a second position shown in FIG. 11(b). The first position corresponds to the line-winding posture of the bail arm 17, whereas the second position corresponds to the line-releasing posture of the bail arm 17. Furthermore, the rear end portion 51c of the moving member 51 is guided by the guide groove 36 and can move back and forth between the first position (withdrawn position) shown in FIG. 3(a) and the second position (contact position) shown in FIG. 3(b). The first position (withdrawn position) corresponds to the line-winding posture, whereas the second position (contact position) corresponds to the line-releasing posture. In the second position (contact position), the end surface of the rear end portion 51c of the moving member 51 contacts a portion behind the front surface of the braking member 65, so that the drag portion 65a is slightly compressed. Therefore, even if the moving position of the moving member 51, i.e. the second position (contact position), fluctuates in the axial direction, the braking force will not change In addition, in the second position (contact position), when the rotor 3 is rotated with the handle 1 in the line-winding direction, the rear end portion 51c of the moving member 51 strikes the oblique surface 60 of the switching member 52 and rotates, the moving member 51 is pushed forward toward the first position (withdrawn position), and the bail arm 17 returns to the line-winding posture at a point where the toggle spring mechanism 50 exceeds the dead point.

As shown in FIG. 2, a reverse rotation check mechanism 70 for blocking and releasing the reverse rotation of the rotor 3 is disposed inside the cylindrical portion 30 of the rotor 3. The reverse rotation prevention mechanism 70 includes a roller-type one-way clutch 72, and a stopper shaft 73 for switching the one-way clutch 72 between an operational state and a non-operational state.

Figure 15:
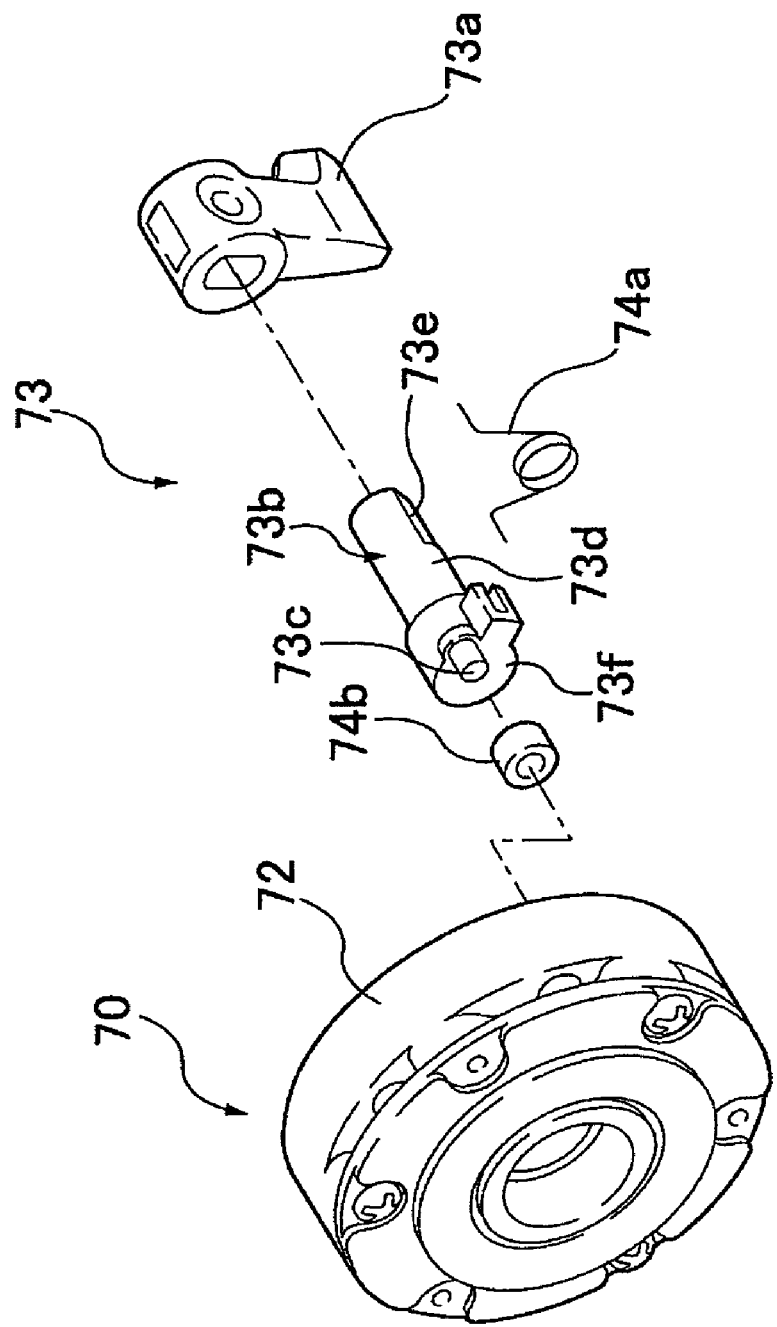
FIG. 15 is an exploded oblique view of a reverse rotation prevention mechanism of the spinning reel in accordance with the embodiment of the present invention.
Figure 16:
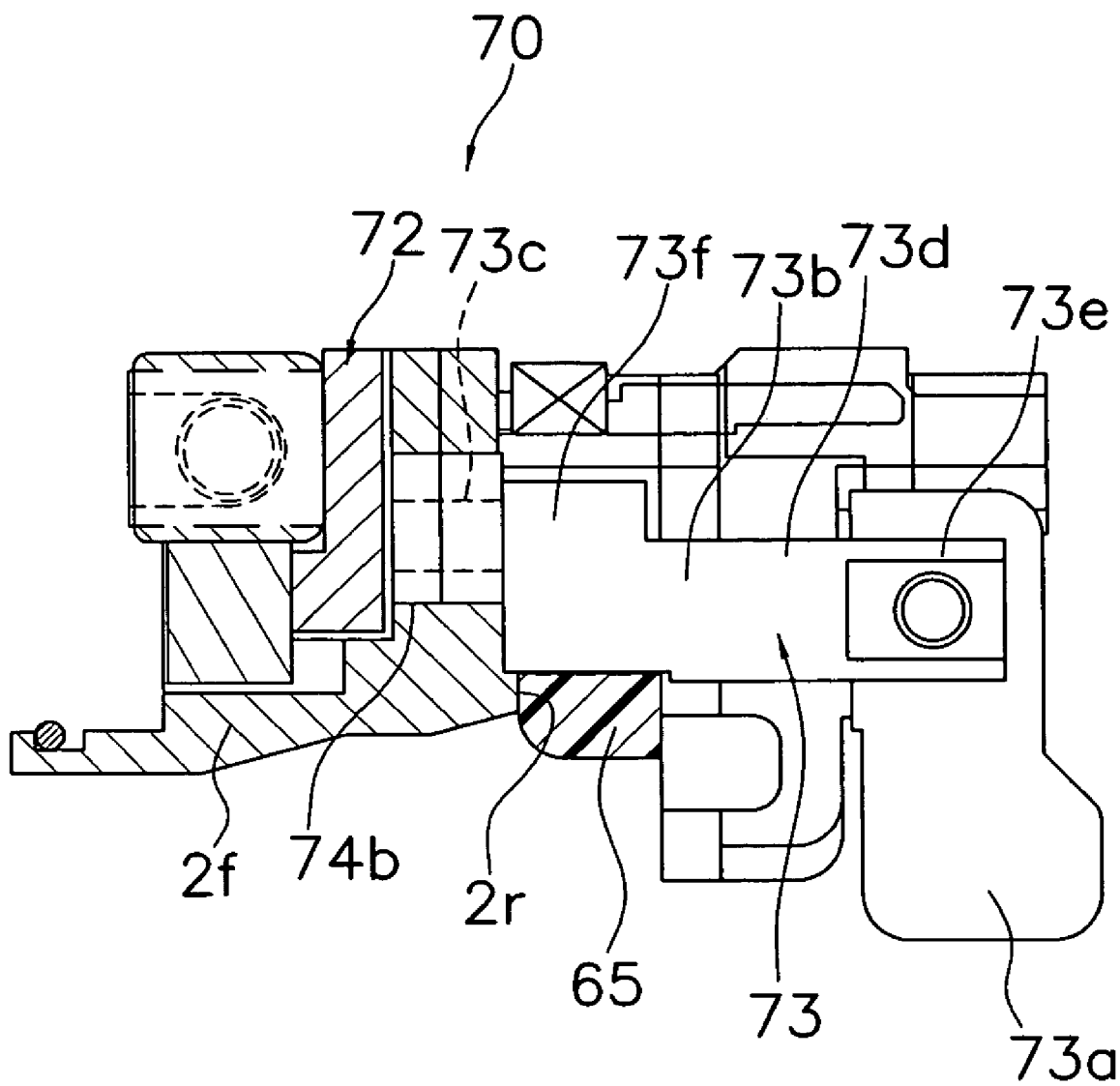
FIG. 16 is an enlarged cross-sectional view of the reverse rotation prevention mechanism of the spinning reel in accordance with the embodiment of the present invention.
Figure 17:
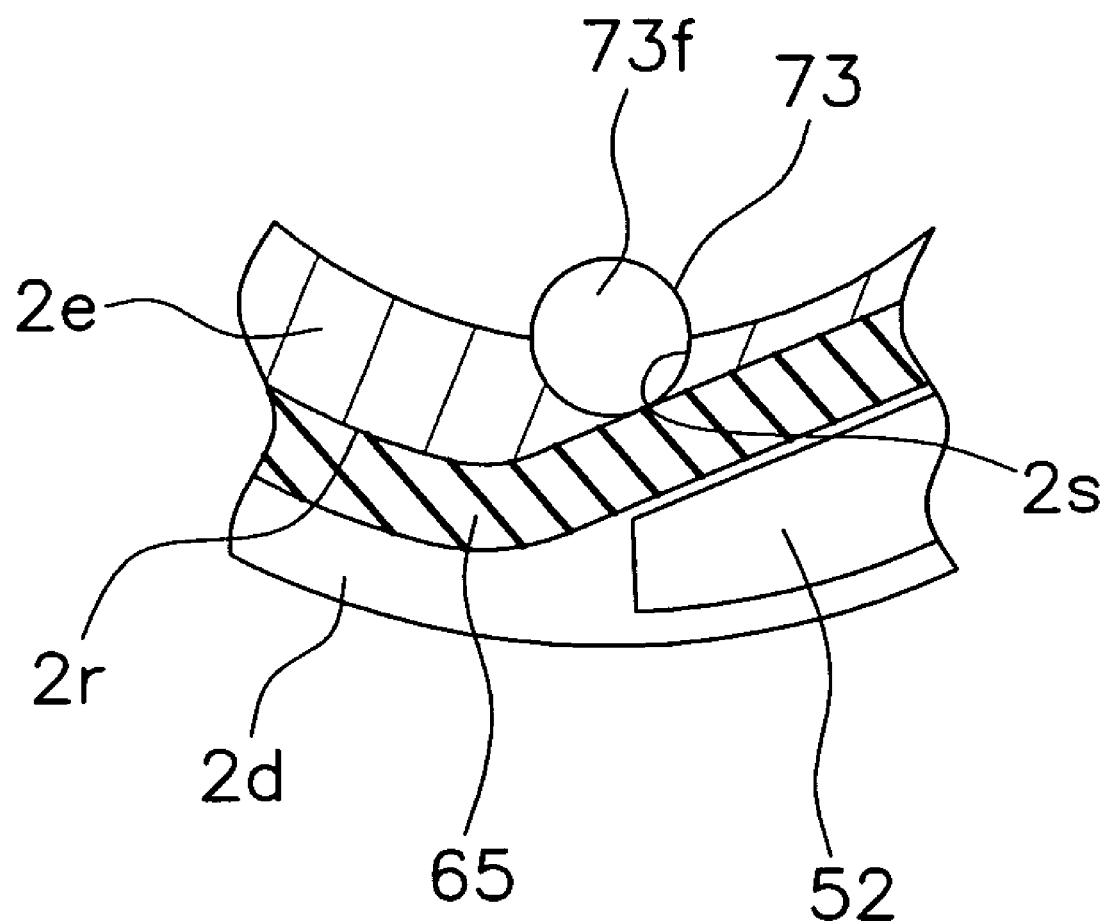
FIG. 17 is an enlarged plan view of the reverse rotation prevention mechanism of the spinning reel in accordance with the embodiment of the present invention.

As shown in FIGS. 15 and 16, the stopper shaft 73 includes a stopper knob 73a that projects outward on the lower portion of the reel unit 2, a shaft portion 73b on rear end of which the stopper knob 73a is fixed, and a cam portion 73c that is eccentrically fixed to the front end of the shaft portion 73b and switches the one-way clutch on and off. As shown in FIG. 17, the shaft portion 73b is mounted in and supported by the cut-out portion 2s of the mounting groove 2r, and is disposed so that the outer periphery thereof is in contact with the inner periphery of the braking member 65. Here, because the braking member 65 is in contact with the outer periphery of the shaft portion 73b, the portion of the shaft portion 73 exposed through the cut-out portion 2s can be covered and made waterproof.

As shown in FIGS. 1, 15, and 16, the stopper knob 73 is arranged to project outward on the lower portion of the reel unit 2 to the rear of the rotor 3, and is mounted so as to be pivotable from left to right. As shown in FIG. 12, the stopper knob 73a is non-rotatively screwed to the rear portion of the shaft portion 73b.

As shown in FIGS. 1, 15 and 16, the shaft portion 73b is a shaft member made of a cylindrical shaped metal, and includes a main shaft portion 73d, a fixed portion 73e that is formed on the rear end of the main shaft portion 73d and to which the stopper knob 73a is mounted and fixed, and a large diameter portion 73f on the front end surface of which the cam portion 73c is eccentrically disposed. One end of a toggle spring 74a is engaged on the side of the large diameter portion 73f, and thus the shaft portion 73b can be moved between two positions, i.e., an operational posture and a non-operational posture. As shown in FIGS. 13, 16, and 17, the shaft portion 73b is disposed so that the outer periphery of the large diameter portion 73f is in contact with the inner periphery of the braking member 65.

As shown in FIGS. 15 and 16, the cam portion 73c is arranged to project eccentrically outward on the front end surface of the large diameter portion 73f of the shaft portion 73b. A cylindrical collar member 74b is mounted around the periphery of the cam portion 73c, and is engaged with the switching portion on the rear portion of the one-way clutch 72 in a state in which the collar member 74b is mounted on the cam portion 73c. Here, the cam member 73c will pivot by pivoting the stopper knob 73a from left to right, and will switch between the operational state of the one-way clutch 72 in which the cam is engaged and the non-operational state.

Structure of Spool

The spool 4 is the shallow type spool forged from, for example, a stainless steel alloy. As shown in FIG. 2, the spool 4 is disposed between the first rotor arm 31 and the second rotor arm 32 of the rotor 3, and is fixedly coupled to the tip of the spool shaft 15 via a drag mechanism 80. As shown in an enlarged view in FIG. 18, the spool 4 includes a spool unit 75 for example forged from stainless steel alloy, a front flange portion 76 that is attached to the front end of the spool unit 75, and a front flange fixing member 77 that serves to fix the front flange portion 76 to the spool unit 75. The spool body 75 includes a cylindrical bobbin portion 75a around the outer periphery of which fishing line is wound and a large diameter cylindrical skirt portion 75b that is unitarily formed on the rear end of the bobbin portion 75a.

On the tip end of the inner circumferential surface of the cylindrical bobbin portion 75a, a female threaded portion 75c into which the front flange fixing member 77 is threaded is formed. On the intermediate portion of the inner circumferential surface of the cylindrical bobbin portion 75a, a wall surface 78 of which the center is penetrated by the spool shaft 15 is formed integrally with the cylindrical bobbin portion 75a. A support member 75h is mounted to the wall surface 78. The support member 75h includes a screw portion 75e on the front end thereof that is screwed to the wall surface 78, and a large diameter portion 75g that is provided with a large diameter on the rear end of the screw portion 75e and to which the line stop member 75d is mounted with the bolt 75j. A spacer 75i having the same diameter as that of the large diameter portion 75g is mounted between the large diameter portion 75g and the line stop member 75d. Here, even if the cylindrical bobbin portion 75a is formed with thin walls, the line stop member 75d can be mounted on the support member 75h.

The front flange portion 76, for example, includes a ring shaped outer portion 76a made from hard ceramics, and an inner portion 76b to which the outer portion 76a is mounted on its outer peripheral surface in a state of restricting backward movement.

The front flange fixing member 77 is a member made from a metal and serves to press and fix the outer portion 76a to the inner portion 76b. The front flange fixing member 77 includes a first cylindrical portion 77a and a second cylindrical portion 77b that are disposed to be concentric with the spool shaft 15, and a contact portion 77c that is unitarily formed with the first cylindrical portion 77a and the second cylindrical portion 77b so as to connect to the first cylindrical portion 77a and the second cylindrical portion 77b at the front portions thereof. The first cylindrical portion 77a includes a male threaded portion 77d on the outer peripheral surface thereof that engages with the female threaded portion 75k of the cylindrical member 75a. The second cylindrical portion 77b is disposed to be spaced apart from the inner peripheral side of the first cylindrical portion 77a. The contact portion 77c projects outward from the first cylindrical portion 77a in the radial direction, and contacts with the front surface of the front flange portion 76. The outer portion 76a of the front flange portion 76 is fixedly attached to the inner portion 76b by pressing the outer portion 76a of the front flange portion 76 toward the inner portion 76b with the contact portion 77c.

Figure 18:
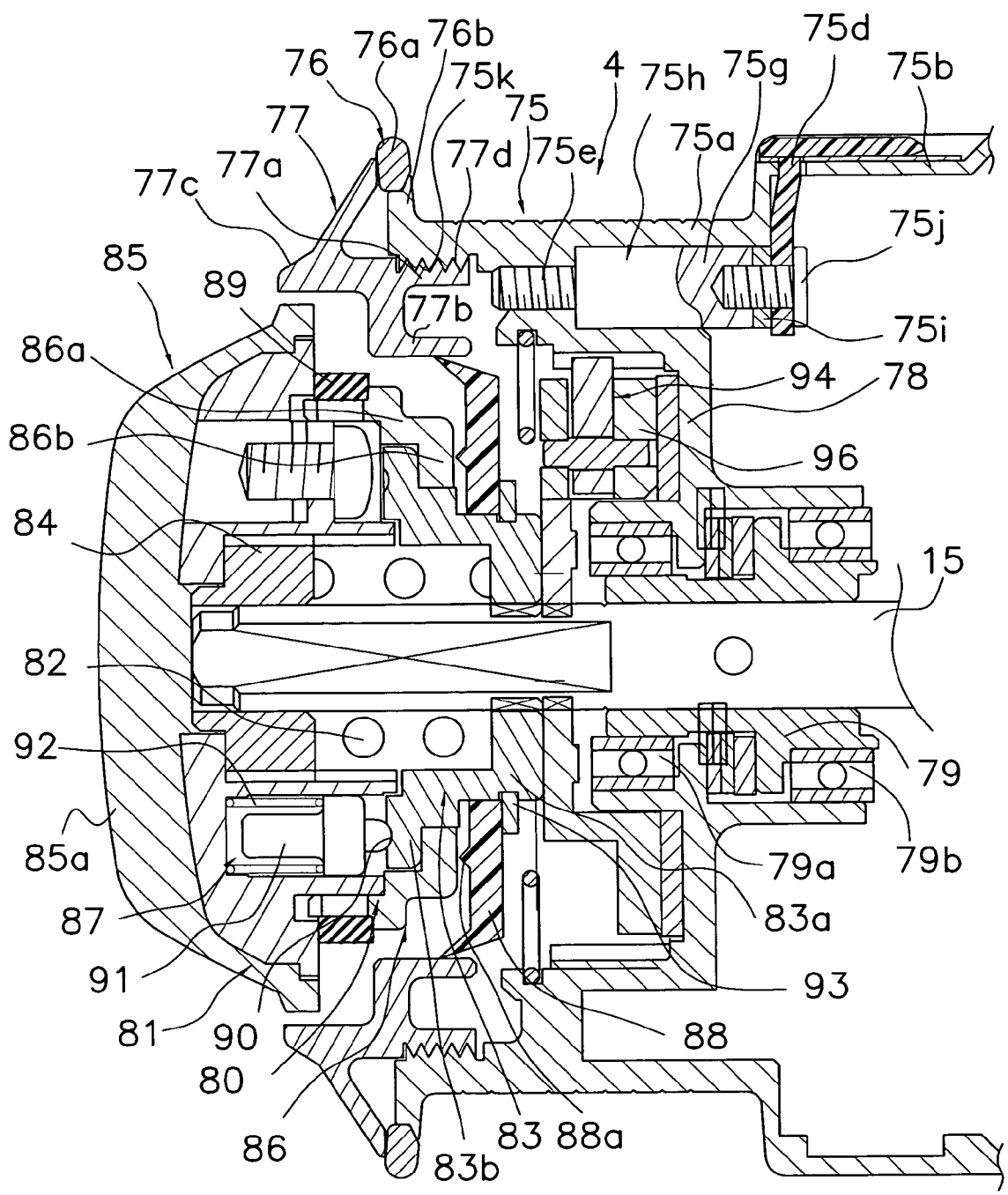
FIG. 18 is a lateral cross-sectional view of a spool of the spinning reel in accordance with the embodiment of the present invention.
Figure 19:
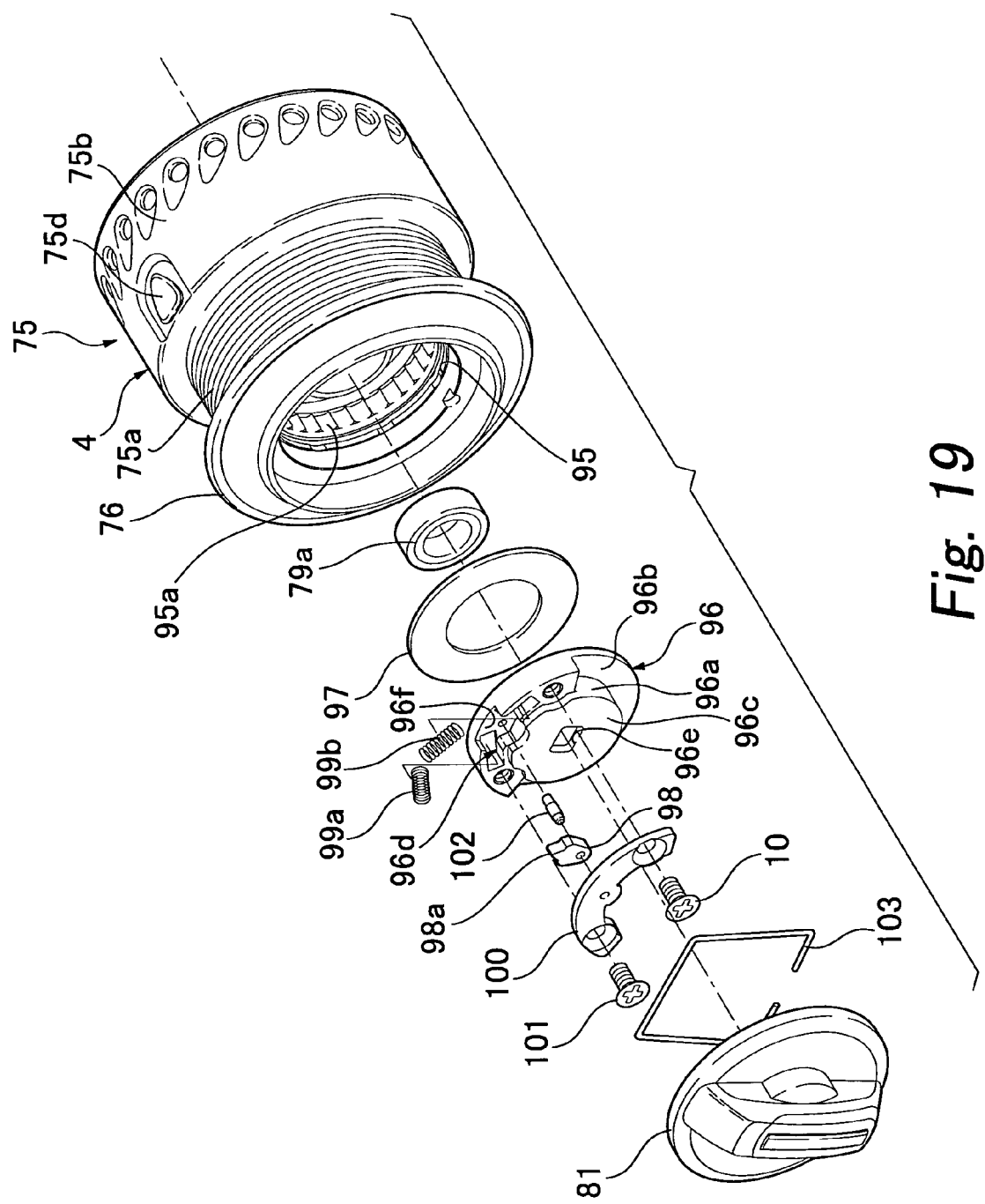
FIG. 19 is an exploded oblique view of a sounding mechanism of the spinning reel in accordance with the embodiment of the present invention.

As shown in FIG. 18, the drag mechanism 80 is a mechanism that is disposed in the accommodation space of the cylindrical bobbin portion 75a, and serves to apply a drag force to the spool 4 by braking the rotation of the spool 4 in the line releasing direction. The drag mechanism 80 includes an operation knob 81 for manually operating the drag force, a coil spring 82 that is compressed/elongated by operation of the operation knob 81, a pressing member 83 in which the pressing force thereof will change through changes in the spring force of the coil spring 82, and a second member 96 that acts as a drag disk mounted between the pressing member 83 and the wall surface 78.

The operation knob 81 includes a nut 84 that engages with the spool shaft 15, and knob member 85 on which the nut 84 is mounted, and is rotatable with respect to the spool 4. The external shape of the nut 84 is square, and the nut 84 is mounted so as to be non-rotatable but movable in the axial direction relative to and inside the knob member 85. The knob member 85 is a disk-shaped member. An approximately trapezoidal knob 85a that projects forward is formed on the front surface of the knob member 85.

The coil spring 82 is mounted on the outer peripheral side of the spool shaft 15, the tip of the coil spring 82 can be compressed to be in contact with the nut 84, and the rear end of the coil spring 82 is in contact with the pressing member 83.

The pressing member 83 is rotatively linked with the operation knob 81 but not movable in the axial direction, and is non-rotatable with respect to the spool shaft 15. The pressing force of the pressing member 83 will change by coming into contact with the rear end of the coil spring 82 and due to the spring force of the coil spring 82. The pressing member 83 is a cylindrical member having a brim, and includes a cylindrical portion 83a and a ring-shaped brim portion 83b larger in diameter than the cylindrical portion 83a. A slot shaped engagement hole 83 into which the spool shaft 15 non-rotatably engages is formed in the inner peripheral portion of the cylindrical portion 83a. A plurality of semi-spherical sounding holes 90 are formed in a row in the circumferential direction in the front end surface of the brim portion 83b. The pressing member 83 is linked to the operation knob 81 through a linking member 86.

In addition, a seal plate 88 is mounted between the outer peripheral surface of the cylindrical portion 83a of the pressing member 83 and the inner peripheral surface of the second cylindrical portion 77b of the front flange fixing member 77. The seal plate 88 is provided in order to prevent water from seeping into the drag mechanism 80 from the front. The seal plate 88 is a plate shaped seal member made of NBR having a lip on the outer peripheral edge thereof. The seal plate 88 is urged leftward in FIG. 18 by a snap ring 93. A ring-shaped projection 88a is formed on the left side (in FIG. 18) surface of the seal plate 88. This projection 88a is in contact with the linking member 86 and prevents liquids from leaking into the inner peripheral side.

The linking member 86 is a cylindrically shaped member with a bottom and includes a cylindrical portion 86a and a ring shaped floor portion 86b. The cylindrical portion 83a of the pressing member 83 passes through the floor portion 86b. In addition, the projection 88a of the seal plate 88 is in contact with the rear surface of the floor portion 86b. The cylindrical portion 86a of the linking member 86 is screwed to the outer peripheral surface of the knob member 85. An O-ring 89 that has a rectangular section is mounted between the front end of the cylindrical portion 86a of the linking member 86 and the knob member 85. The O-ring 89 is an elastic member made of NBR, and is provided in order to prevent water from entering through the gap between the pressing member 83 and the knob member 85 into the interior.

Sounding Mechanisms

A first sounding mechanism 87 that produces sounds through the relative rotation of the knob member 85 and the pressing member 83, i.e., through the operation of the operation knob 81, is provided between the knob member 85 and the pressing member 83. The first sounding mechanism 87 includes sounding holes 90 that are formed in the cylindrical portion 83a of the pressing member 83, a sounding pin 91 that is accommodated in the knob member 85, and a sounding spring 92 that is a coil spring that urges the sounding pin 91 toward the sounding holes 90. The sounding pin 91 and the sounding spring 92 are disposed at two locations on the rear end surface of the knob member 85 at positions which face the sounding holes 90.

As shown in FIG. 18, the drag mechanism 80 further includes a second sounding mechanism 94 that is an embodiment of the present invention and produces sound when the drag mechanism 80 operates. The second sounding mechanism 94 produces sound when the spool shaft 15 and the spool 4 are relatively rotated by the operation of the drag. As shown in FIGS. 18 to 21, the second sounding mechanism 94 includes a first member 95 that is integrally formed on the inner peripheral portion of the bobbin portion 75a of the spool 4, the second member 96 that is non-rotatably mounted on the spool shaft 15, a plurality of concave/convex portions 95a that are formed on the inner peripheral surface of the first member 95 so as to be spaced apart in the circumferential direction, a pawl member 98 that is arranged on the second member 96 to be pivotable and contactable with the concave/convex portions 95a, and a pair of urging members 99a, 99b that are arranged on both sides of the pawl member 98 of the second member 96 and urge the pawl member 98 to a central position by pressing the pawl member 98 on both sides thereof.

Although the first member 95 is integrally formed on the inner peripheral portion of the bobbin portion 75a of the spool 4 in this embodiment, the first member 95 can be separately formed from the bobbin portion 75a as described later.

The second member 96 is a brimmed cylindrical member that is also used as a drag disk of the drag mechanism 80, and is non-rotatably mounted on the spool shaft 15. The second member 96 includes a cylindrical portion 96a, a brim portion 96b that is formed on a rear end of the cylindrical portion 96a, a bottom portion 96c that is formed on a front face of the cylindrical portion 96a, and a pawl accommodation portion 96d that is formed on an outer peripheral surface of the cylindrical portion 96a and projects from the brim portion 96b. A rectangular hole 96e to be non-rotatably mounted on the spool shaft 15 is formed on the bottom portion 96c. A stepped pin 102 is mounted on the pawl accommodation portion 96d. The stepped pin 102 pivotably supports the pawl member 98. An accommodation concave portion 96f is formed on the pawl accommodation portion 96*d*, which serves to accommodate the pawl member 98 and the pair of urging members 99*a* and 99*b*. A holding plate 100 that is formed in an arc shape is fixedly coupled to the pawl accommodation portion 96*d* by screws 101. The holding plate 100 prevents the pawl member 98 and the pair of urging members 99*a*, 99*b* from falling off. In addition, a falling off prevention spring 103 that is disposed in front of the holding plate 100 prevents the holding plate 100 from falling off. The falling off prevention spring 103 is engaged to a ring shaped groove 75*f*.

Figure 21:
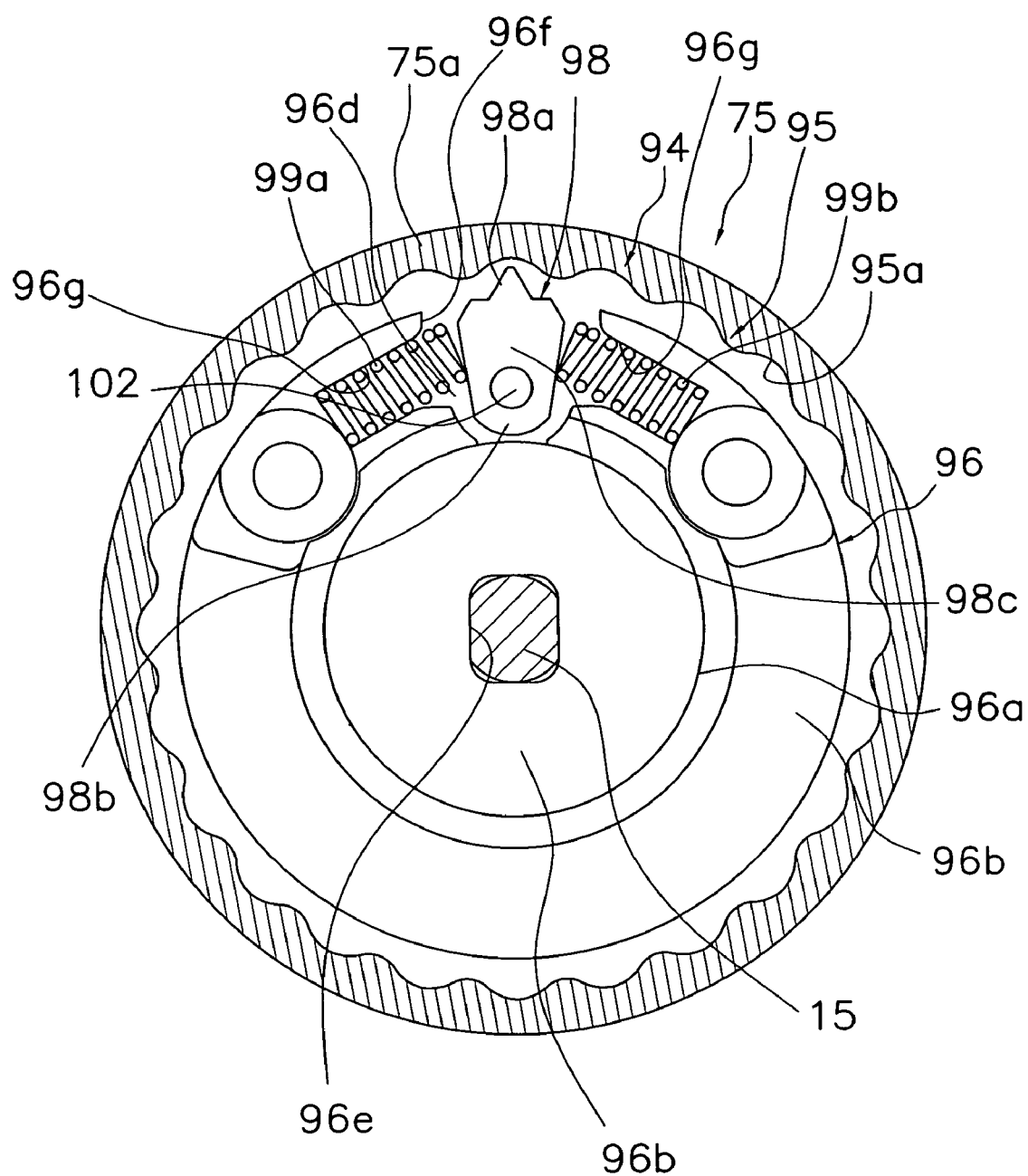
FIG. 21 is a front cross-sectional view of the spool of the spinning reel in accordance with the embodiment of the present invention.

A pair of guiding portions 96*g* that guide the urging members 99*a*, 99*b* in the urging direction is formed on the accommodation concave portion 96*f*, as shown in FIG. 21. The guide portions 96*g* are configured from approximate C-shaped wall surfaces that extend along the outer periphery of the ends and the sides of the urging members 99*a*, 99*b*.

The pawl member 98 is a member having a tip portion that projects outward. The pawl member 98 is pivotably mounted in a central portion between the pair of guide portions 96*g* of the accommodation concave portion 96*f*. The pawl member 98 includes a pawl portion 98*a* whose tip projects outward, a mounting portion 98*b* that is formed on a base end of the pawl member 98 and is pivotably mounted to the stepped pin 102, and a spring engaging portion 98*c* that is formed widely in comparison with the pawl portion 98*a* and tapers toward the mounting portion 98*b* such that its width becomes narrow gradually. The pawl portion 98*a* is arranged so that it can come into contact with the concave/convex portions 95*a*, and the concave/convex portions 95*a* will repeatedly contact the pawl member 98 to produce sounds when the spool 4 rotates. The urging members 99*a*, 99*b* contact both sides of the spring engaging portion 98*c*.

Figure 20:
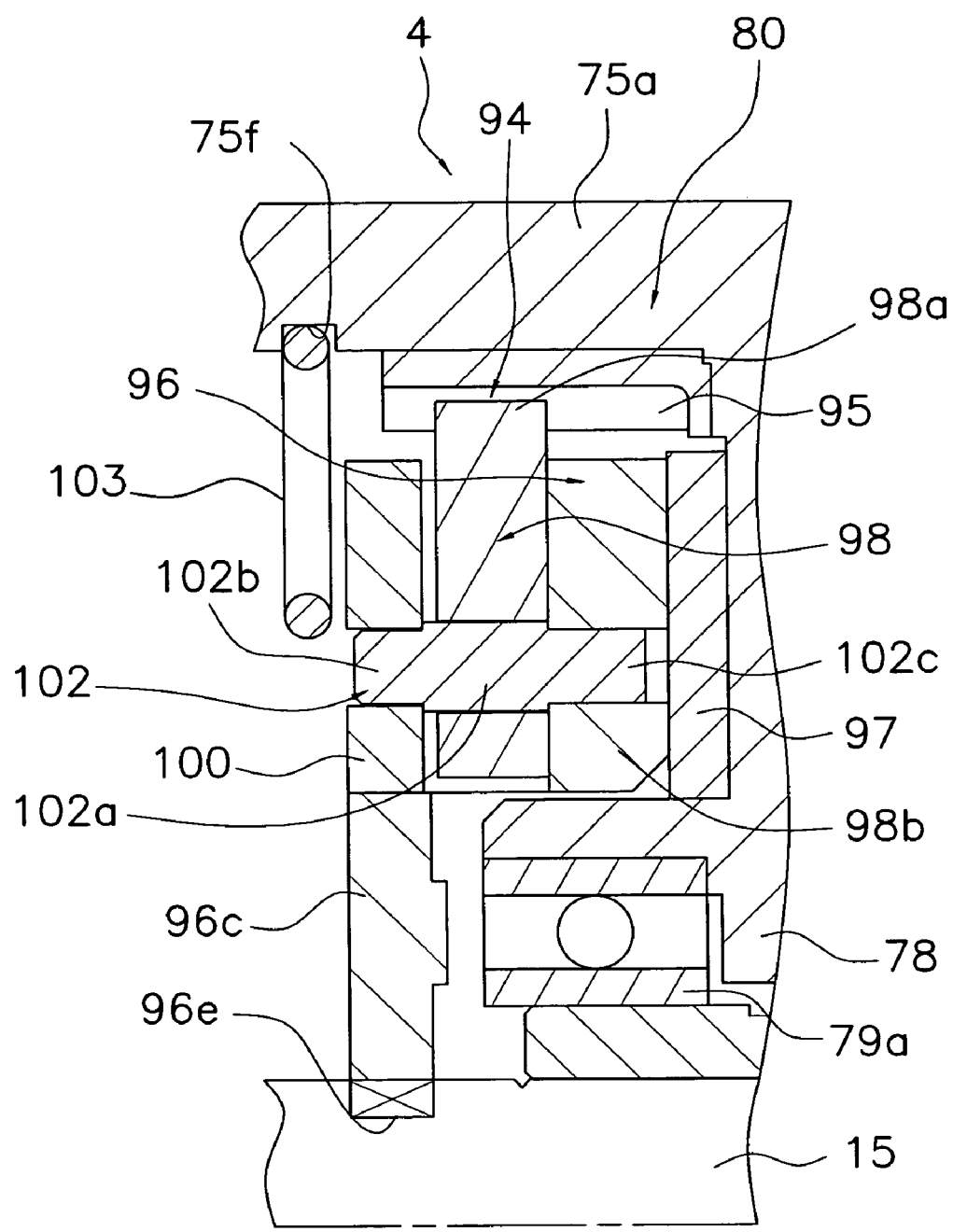
FIG. 20 is an enlarged cross-sectional view of the sounding mechanism of the spinning reel in accordance with the embodiment of the present invention.

As shown in FIG. 20, the stepped pin 102 includes a large diameter shaft portion 102*a*, a tip portion 102*b* and a base portion 102*c*. The tip portion 102*b* and the base portion 102*c* are respectively formed on both ends of the large diameter shaft portion 102*a* with a diameter that is smaller than that of the shaft portion 102*a*. The tip portion 102*b* is mounted in the holding plate 100, and the base portion 102*c* is mounted in the pawl accommodation portion 96*d*. The axial length of the shaft portion 102*a* is formed to be longer than the thickness of the pawl member 98. Because of this, clear, crisp sounds can be obtained because the pivoting of the pawl member 98 will not be hindered.

Figure 22:
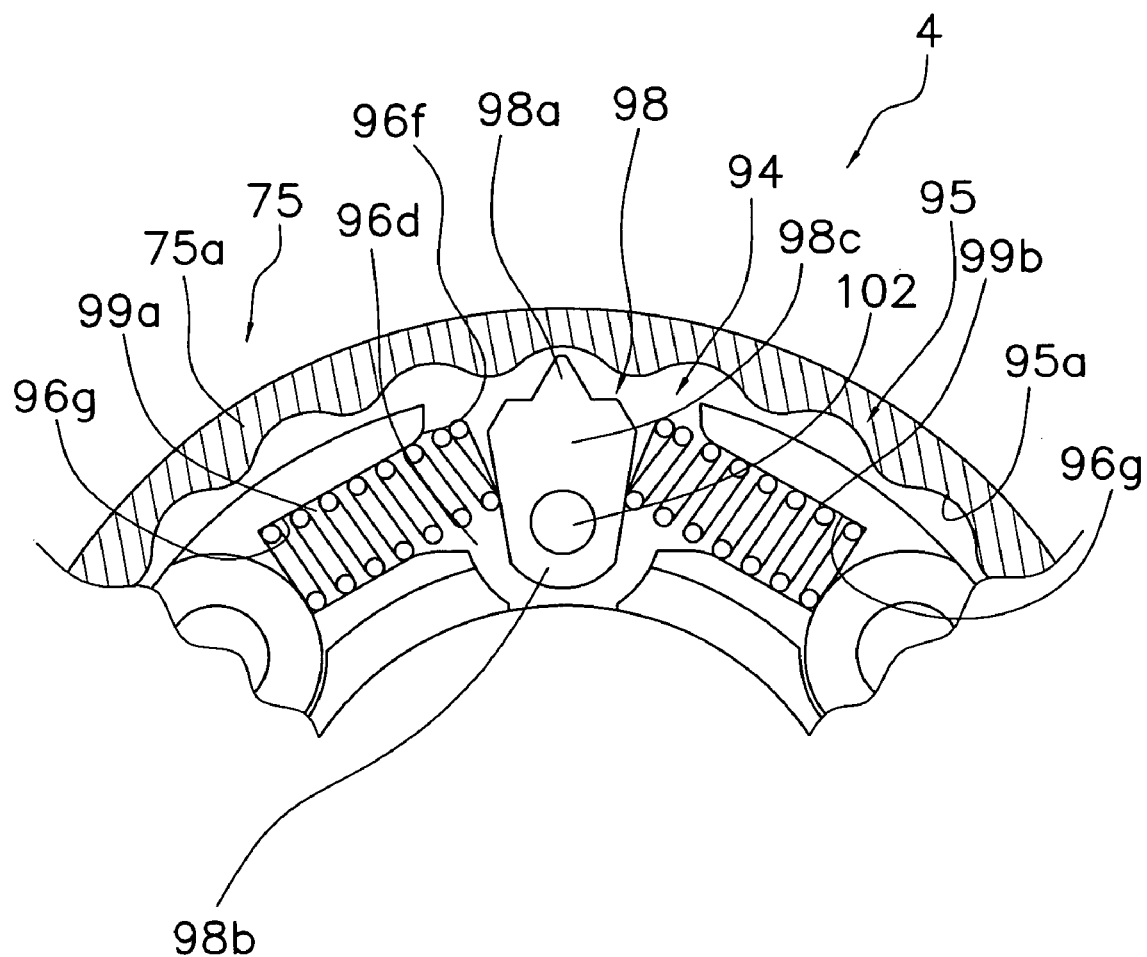
FIG. 22 is an enlarged cross-sectional view of the sounding mechanism of the spinning reel in accordance with the embodiment of the present invention.
Figure 23:
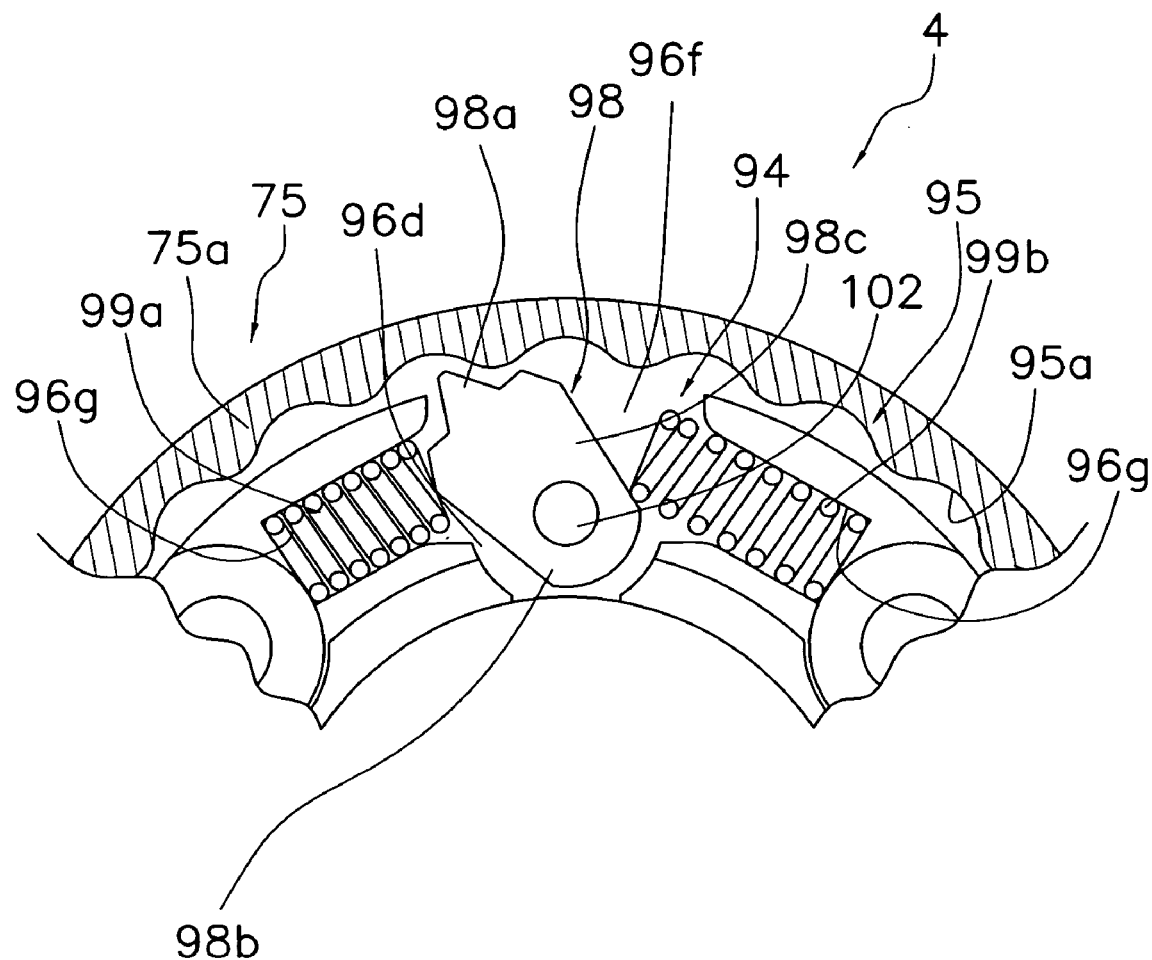
FIG. 23 is an enlarged cross-sectional view of the sounding mechanism of the spinning reel in accordance with the embodiment of the present invention when the sounding mechanism produces sound.

The urging members 99*a*, 99*b* are disposed on both sides of the pawl member 98, and are coil springs that are mounted in a compressed state in the pair of guide portions 96*g*. The urging members 99*a*, 99*b* are mounted so as to come into contact with both sides of the spring engaging portion 98*c* of the pawl member 98 and the bottom portions of the guide portions 96*g*, and urge the pawl member 98 to the central position shown in FIG. 22. Here, when the spool 4 is rotated and the pawl member 98 is placed in the pivot position shown in FIG. 23, the concave/convex portions 95*a* will come in contact with the pawl member 98 and sounds will be produced. When this occurs, the urging member 99*a* will urge to elongate and the urging member 99*b* will urge to contract in response to the pivoting of the pawl member 98, and thus the pawl member 98 will retreat in the rotational direction, and the resistance in the rotational direction can be reduced.

With the second sounding mechanism 94 having the structure described above, when the drag is operated and the spool 4 rotates, the pawl member 98 will repeatedly strike the concave/convex portions 95*a* to produce sound.

Operation and Function of the Reel

Before fishing, the drag force is adjusted in accordance with the size and species of fish. To adjust the drag force, the drag knob 85 is turned. When the drag knob 85 is turned for example clockwise, the pressing member 83 will press the second member 96 via the coil springs 82 by the nut 84 engaged with the spool shaft 15. This increases the drag force. Due to the relative rotation of the pressing member 83 and the knob member 85, the sounding pins 91 of the first sounding mechanism 87 will repeatedly collide with the sounding holes 90 that are formed at predetermined intervals to produce clear, crisp clicking sounds.

During casting, the bail arm 45 is flipped over to the line-releasing posture. Thus, the first bail support member 40 and the second bail support member 42 pivot. In this state, the fishing rod is cast while the angler grasps the fishing line with the index finger of the hand with which the fishing rod is held. Thus, the fishing line is released with high momentum due to the weight of the tackle. When the handle 1 is turned in the line-winding direction in this state, the rotor 3 rotates in the line-winding direction due to the rotor drive mechanism 5, and the bail tripping mechanism 46 returns the bail arm 45 to the line-winding posture and the fishing line is wound onto the spool 4. When a fish is caught and drag is applied in this state, the spool 4 will rotate with respect to the spool shaft 15. At this point, the second sounding mechanism 94 will produce sounds, and this will notify the fisherman that a fish has been caught. Then, the spool 4 will rotate in the line release direction with the drag force that has been set.

With the second sounding mechanism 94 of the spinning reel described above, the pair of urging members 99*a*, 99*b* are provided on both sides of the pawl member 98 and urge the pawl member 98 into the central position by pushing from both sides of the pawl member 98, and the pawl member 98 is urged in the rotational direction with respect to the concave/convex portions 95*a*. Because of this, when the pawl member 98 comes into contact with the concave/convex portions 95*a*, resistance in the rotational direction can be reduced because the pawl member 98 will move in the rotational direction due to the urging members 99*a*, 99*b*. Thus, because it will be difficult for large fluctuations in the rotational torque of the spool 4 to occur during sound production, the spool 4 can be smoothly rotated, and the clear, crisp sounds can be obtained.

Other Embodiments

Referring now to FIG. 24–27, a sounding mechanism in accordance with alternate embodiments will now be explained. In view of the similarity between the first and alternate embodiments, the parts of the alternate embodiment that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

(a) In the aforementioned embodiment, a standard spinning reel having a front drag was used as an example, but the present invention is not limited thereto, and may be applied to any type of spinning reel.

Figure 24:
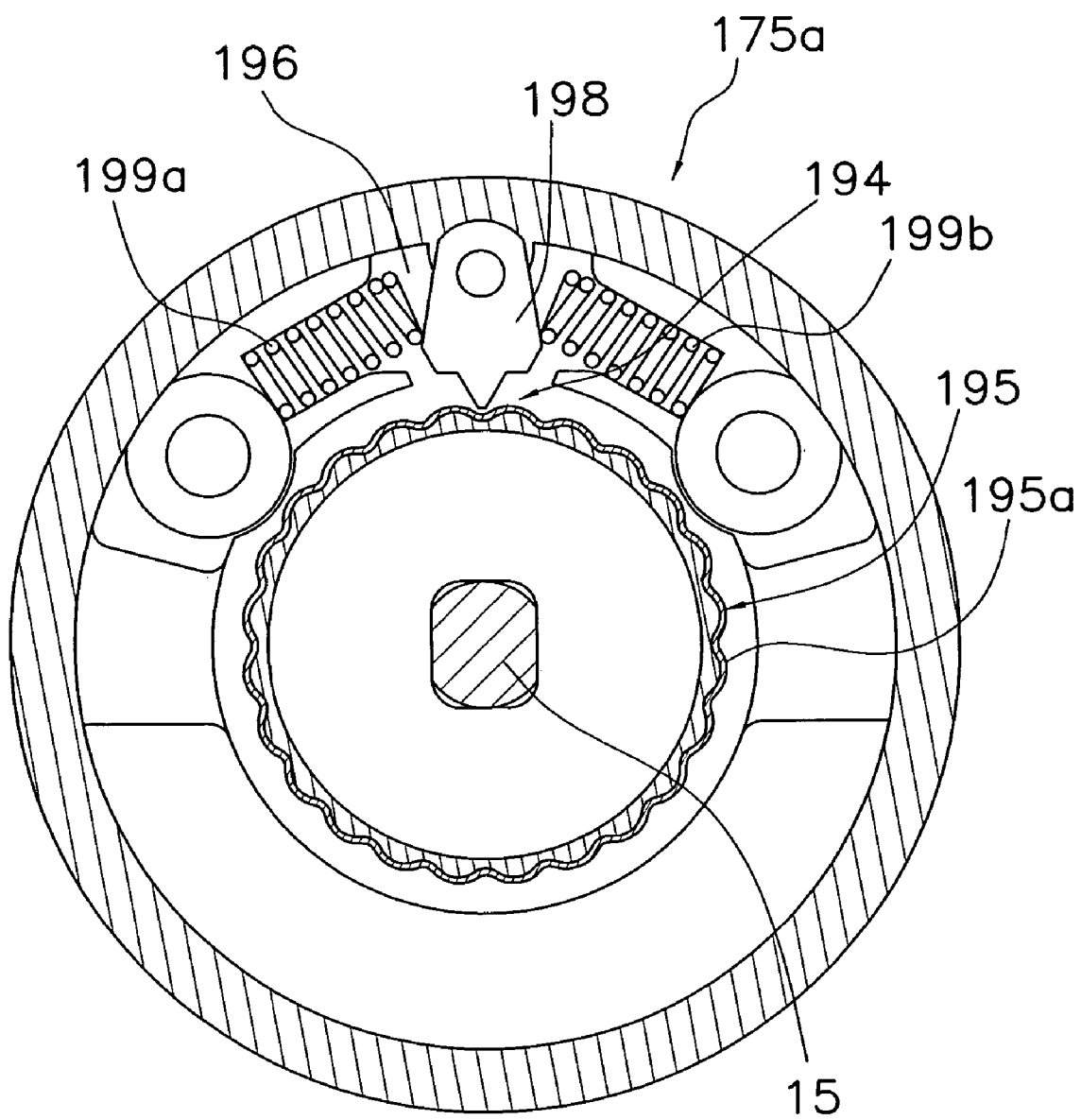
FIG. 24 is an enlarged cross-sectional view of an area around a cap member of the spinning reel in accordance with an alternate embodiment (b) of the present invention.

(b) In the aforementioned embodiment, the second sounding mechanism 94 includes the first member 95 that is integrally formed on the bobbin portion 75*a*, the second member 96 that is non-rotatably mounted on the spool shaft 15, the plurality of concave/convex portions 95*a* that are formed on the inner peripheral surface of the first member 95 to be spaced apart in the circumferential direction, the pawl member 98 that is arranged on the second member 96 to be pivotable and contactable with the concave/convex portions 95*a*, and the pair of urging members 99*a*, 99*b* that are arranged on both sides of the pawl member 98 of the second member 96 and urge the pawl member 98 to a central position by pressing on both sides thereof. However, as shown in FIG. 24, the sounding mechanism of the present invention may be formed as a second sounding mechanism 194, which has a different structure. That is, the second sounding mechanism 194 includes a first member 195 that is non-rotatably arranged with respect to the spool shaft 15 on the outer periphery of the spool shaft 15, a second member 196 that is integrally formed on the bobbin portion 175*a*, a plurality of concave/convex portions 195*a* that are formed on the outer peripheral surface of the first member 195 to be spaced apart in the circumferential direction, a pawl member 198 that is arranged on the second member 196 to be pivotable and contactable with the concave/convex portions 195*a*, and a pair of urging members 199*a*, 199*b* that are arranged on both sides of the pawl member 198 of the second member 196 and which urge the pawl member 198 to a central position by pressing on both sides thereof.

(c) In the aforementioned embodiment, the first member 95 is integrally formed the bobbin portion 75*a* of the spool unit 75. However, as shown FIGS. 25 to 27 the first member 295,395 may be separated from the spool unit 275, 75.

Figure 25:
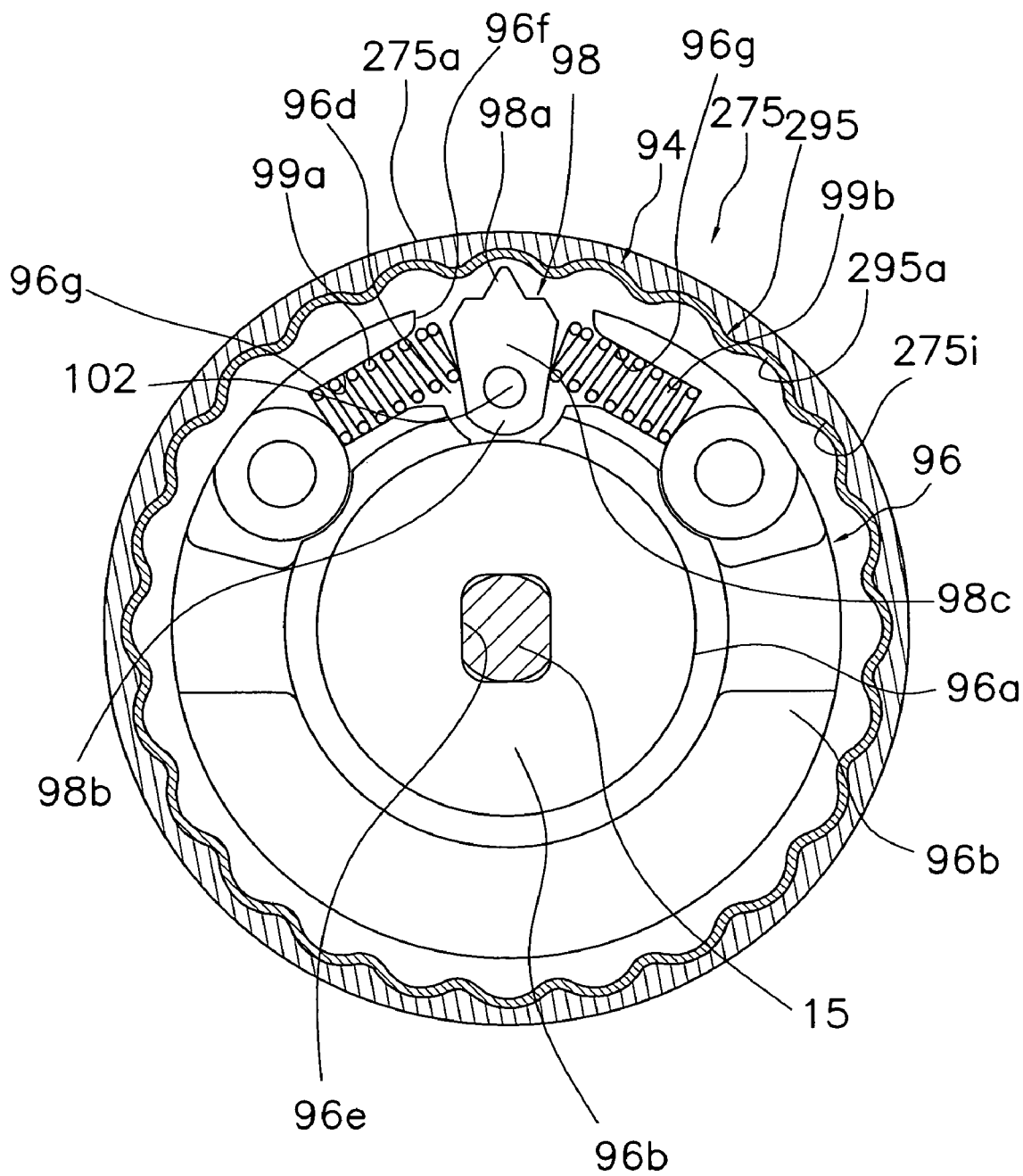
FIG. 25 is an enlarged cross-sectional view of an area around a cap member of the spinning reel in accordance with still an alternate embodiment (c) of the present invention.

In FIG. 25, wave shaped concave/convex surface portions 275*i* that serve to mount the first member 295 are formed on the inner surface of a bobbin portion 275*a*. The first member 295 is non-rotatably mounted on the concave/convex surface portions 275*i*. The first member 295 is a cylindrical member with an inner flange made of a metal in which the concave/convex portions 295*a* are formed along the concave/convex surface portions 275*i* of the bobbin portion 275*a* in rows in the circumferential direction. The concave/convex portions 295*a* are formed by press working the inside and outside of cylindrically shaped sheet metal, and are disposed so that the tip of the pawl member 98 can come into contact therewith.

Figure 26:
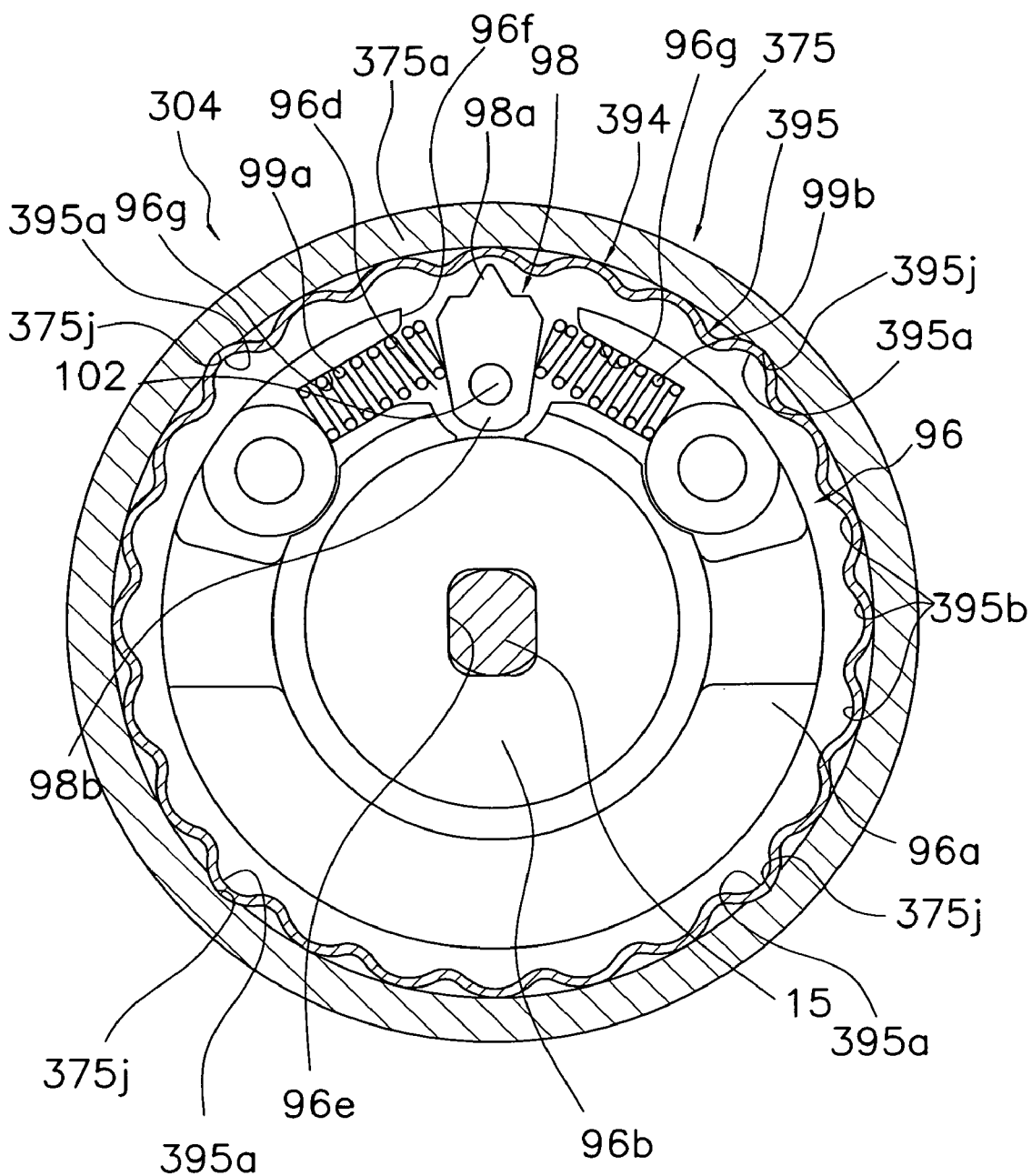
FIG. 26 is an enlarged cross-sectional view of an area around a cap member of the spinning reel in accordance with still an alternate embodiment (d) of the present invention.
Figure 27:
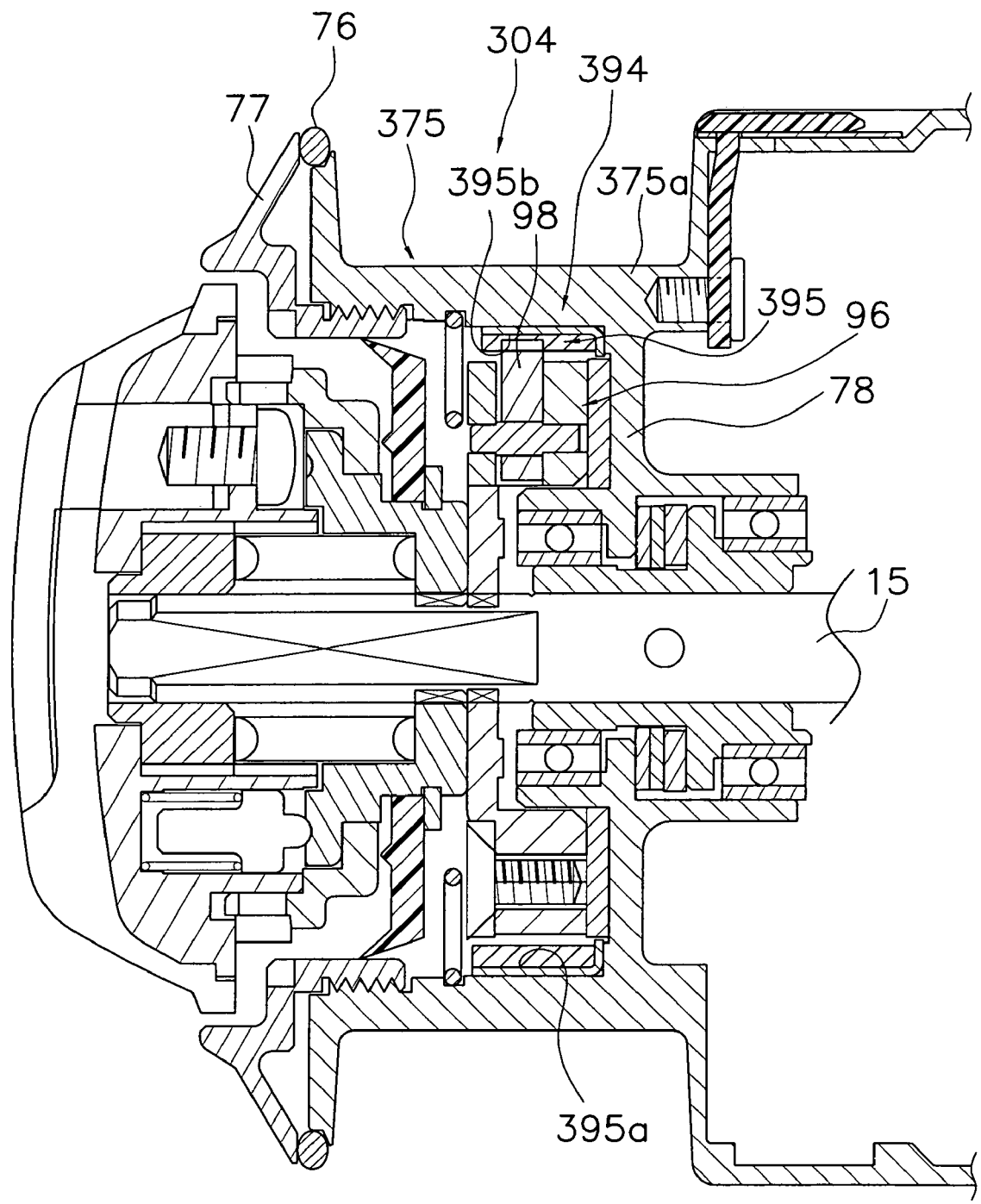
FIG. 27 is a lateral cross-sectional view of a spool of the spinning reel in accordance with the alternate embodiment (d) of the present invention.

(d) FIGS. 26 and 27 show a deep groove type spool 304. A first member 395 is non-rotatably mounted on, for example, four concave/convex surface portions 375*j* that are formed on the inner peripheral side of the bobbin portion 375*a*. The first member 395 is a cylindrical member made of a metal in which four concave/convex portions 395*a* are formed along the concave/convex portions 375*j*. Remaining concave/convex portions 395*b* that are more recessed to inner side than the concave/convex portions 395*a* are also formed in rows in the circumferential direction on the inner peripheral surface of the bobbin portion 375*a*. The concave/convex portions 395*a*, 395*b* are formed by press working the inside and outside of cylindrically shaped sheet metal, and are disposed so that the tip of the pawl member 98 can come into contact therewith. That is, there are two kinds of concave/convex portions 395*a*, 395*b* which are different in the amount of recession. The first member 395 that includes the concave/convex portions 395*a*, 395*b* is mounted on the inner peripheral surface of the bobbin portion 375*a* of the spool 304 with the four concave/convex portions 395*a*. Because of this, the number of concave/convex surface portions 375*j* that are formed in the bobbin portion 375*a* can be reduced, and the concave/convex surface portions 375*j* can be formed easily even if the spool 304 is formed by forging. Note that the number of concave/convex surface portions 375*j* is not limited to four, and the number of concave/convex portions 395*a*, 395*b* can be reduced further, but it is preferable that there be 10 or fewer concave/convex surface portions 375*j* because that way it will be easy to form them by forging.

According to the sounding mechanism of a spinning reel of the present invention, because a pair of urging members that urge a pawl member to a central position by pressing from both sides of the pawl member are arranged on both sides of the pawl member, the spool can be smoothly rotated and clear and crisp sounds can be obtained.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Applications Nos. 2003-366919, 2003-368958, 2004-004510. The entire disclosure of Japanese Patent Applications Nos. 2003-366919, 2003-368958, 2004-004510 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A sounding mechanism of a spinning reel that produces sound by relative rotation between a spool shaft and a spool that winds up and releases fishing line, the sounding mechanism comprising:

a first sounding portion that is non-rotatable with respect to one of the spool and the spool shaft, and has a plurality of concave/convex portions that are formed spaced apart in a circumferential direction on a surface of the first sounding portion; and a second sounding portion that is non-rotatable with respect to the other of the spool and the spool shaft, the second sounding portion having a pawl member that is pivotably arranged to be contactable with the concave/convex portions, and a pair of urging members that are arranged on both sides of the pawl member to urge the pawl member from both sides thereof, the second sounding portion producing sound when the concave/convex portions contact the pawl member as the spool rotates relative to the spool shaft, the pair of compression springs not being put into tension as the spool rotates relative to the spool shaft.

2. The sounding mechanism as set forth in claim 1, wherein the first sounding portion is formed from a metal.

3. The sounding mechanism as set forth in claim 2, wherein
the concave/convex portions are formed by press working.

4. A sounding mechanism of a spinning reel that produces sound by relative rotation between a spool shaft and a spool that winds up and releases fishing line, the sounding mechanism comprising:
a first sounding portion that is non-rotatable with respect to one of the spool and the spool shaft, and has a plurality of concave/convex portions that are spaced apart in a circumferential direction on a surface of the first sounding portion; and
a second sounding portion that is non-rotatable with respect to the other of the spool and the spool shaft, the second sounding portion having a pawl member that is pivotably arranged to be contactable with the concave/convex portions, and a pair of compression springs that are arranged to contact opposite sede of the pawl member to apply a pair of forces that are each directed toward a center of the pawl member from both sides thereof, the second sounding portion producing sound when the concave/convex portions contact the pawl member as the spool rotates relative to the spool shaft,
the first sounding portion being arranged on an inner periphery of the spool so as to be relatively non-rotatable with the spool; and
the plurality of concave/convex portions being formed on an inner peripheral surface of the first sounding portion.

5. The sounding mechanism as set forth in claim 4, wherein
the first sounding portion is unitarily formed with the spool.

6. The sounding mechanism as set forth in claim 4, wherein
concave/convex surface portions are formed on an inner periphery of the spool, and
the first sounding portion is non-relatively arranged to the spool by coupling the concave/convex portions of the first sounding portion to the concave/convex surface portions of the spool.

7. A sounding mechanism of a spinning reel that produces sound by rotation between a spool shaft and a spool that winds up and releases fishing line, the sounding mechanism comprising:
a first sounding portion that is non-rotatable with respect to one of the spool and the spool shaft, and has a plurality of concave/convex portions that are spaced apart in a circumferential direction on a surface of the first sounding portion; and
a second sounding portion that is non-rotatable with respect to the other of the spool and the spool shaft, the second sounding portion having a pawl member that is pivotably arranged to be contactable with the concave/convex potions, and a pair of compression springs that are arranged to contact opposite sides of the pawl member to apply a pair of forces that are each directed toward a center of the pawl member from both sides thereof, the second sounding portion producing sound when the concave/convex portions contact the pawl member as the spool rotates relative to the spool shaft,
the first sounding portion being non-rotatively arranged with respect to the spool shaft on an outer periphery of the spool shaft, and
the plurality of concave/convex portions being formed on an outer peripheral surface of the first sounding portion.

8. A sounding mechanism of a spinning reel that produces sound by relative rotation between a spool shaft and a spool that winds up and releases fishing line, the sounding mechanism comprising:
a first sounding portion that is non-rotatable with respect to one of the spool and the spool shaft, and has a plurality of concave/convex portions that are spaced apart in a circumferential direction on a surface of the first sounding portion; and
a second sounding portion that is non-rotatable with respect to the other of the spool and the spool shaft, the second sounding portion having a pawl member that is pivotably arranged to be contactable with the concave/convex portions, and a pair of compression springs that are arranged to contact opposite sides of the pawl member to apply a pair of forces that are each directed toward a center of the pawl member from both sides thereof, the second sounding portion producing sound when the concave/convex portions contact the pawl member as the spool rotates relative to the spool shaft,
the spinning reel including a front drag mechanism that is disposed in an interior of the spool to regulate rotation of the spool; and
the first sounding portion and the second portion being mounted in an interior of the front drag mechanism.

9. The sounding mechanism as set forth in claim 8, wherein
the front drag mechanism includes a plurality of drag plates that are non-rotatably mounted on the spool shaft; and
the second sounding portion is one of the plurality of drag plates.

10. A spinning reel, comprising:
a handle;
a reel unit that rotatably supports the handle;
a rotor rotatably supported on a front of the reel unit;
a spool disposed on a front of the rotor so as to be movable forward and backward to wind up fishing reel around an outer periphery of the spool, the spool being rotatable around a spool shaft; and
a sounding mechanism that produces sound by relative rotation between the spool shaft and the spool and includes
a first sounding portion that is non-rotatable with respect to one of the spool and the spool shaft, and has a plurality of concave/convex portions that are formed spaced apart in a circumferential direction on a surface of the first sounding portion, and
a second sounding portion that is non-rotatable with respect to the other of the spool and the spool shaft, the second sounding portion having a pawl member that is pivotably arranged to be contactable with the concave/convex portions, and a pair of urging members that are arranged on both sides of the pawl member to urge the pawl member from both sides thereof, the second sounding portion producing sound when the concave/convex portions contact the pawl member as the spool rotates relative to the spool shaft.

11. The spinning reel as set forth in claim 10, wherein
the first sounding portion is arranged on an inner periphery of the spool so as to be relatively non-rotatable with the spool; and
the plurality of concave/convex portions are formed on an inner peripheral surface of the first sounding portion.

12. The spinning reel as set forth in claim 11, wherein
the first sounding portion is unitarily formed with the spool.

13. The spinning reel as set forth in claim 11, wherein
concave/convex surface portions are formed on an inner periphery of the spool, and
the first sounding portion is non-rotatively arranged to the spool by coupling the concave/convex portions of the first sounding portion to the concave/convex surface portions of the spool.

14. The spinning reel as set forth in claim 10, wherein
the first sounding portion is non-rotatably arranged with respect to the spool shaft on an outer periphery of the spool shaft, and
the plurality of concave/convex portions are formed on an outer peripheral surface of the first sounding portion.

15. The spinning reel as set forth in claim 10, wherein
the first sounding portion is formed from a metal.

16. The spinning reel as set forth in claim 15, wherein
the concave/convex portions are formed by press working.

17. The spinning reel as set forth in claim 10, wherein
the spinning reel includes a front drag mechanism that is disposed in an interior of the spool to regulate rotation of the spool; and
the first sounding portion and the second sounding portion are mounted in an interior of the front drag mechanism.

18. The spinning reel as set forth in claim 17, wherein
the front drag mechanism includes a plurality of drag plates that are non-rotatably mounted on the spool shaft; and
the second sounding portion is one of the plurality of drag plates.

* * * * *